US012567527B2

(12) United States Patent
Chi et al.

(10) Patent No.: US 12,567,527 B2
(45) Date of Patent: Mar. 3, 2026

(54) INDUCTOR, OSCILLATOR, AND TERMINAL DEVICE

(71) Applicant: Huawei Technologies Co., Ltd., Shenzhen (CN)

(72) Inventors: Yusong Chi, Shanghai (CN); Yunfeng Zhao, Shanghai (CN); Huancheng You, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 844 days.

(21) Appl. No.: 17/804,454

(22) Filed: May 27, 2022

(65) Prior Publication Data

US 2022/0293323 A1 Sep. 15, 2022

Related U.S. Application Data

(63) Continuation of application No. PCT/CN2019/121649, filed on Nov. 28, 2019.

(51) Int. Cl.

*H01F 27/29* (2006.01)
*H01F 21/12* (2006.01)
*H01F 27/40* (2006.01)

(52) U.S. Cl.

CPC ............. *H01F 21/12* (2013.01); *H01F 27/29* (2013.01); *H01F 27/40* (2013.01)

(58) Field of Classification Search

CPC .......... H01F 21/12; H01F 27/29; H01F 27/40; H01F 2017/0086; H01F 17/0006; H01F 2021/125; H01F 29/025

See application file for complete search history.

(56) References Cited

U.S. PATENT DOCUMENTS 7,598,838 B2 * 10/2009 Hargrove ................ H01F 21/12 336/200
8,842,410 B2 9/2014 Chan
9,425,737 B1 * 8/2016 Bushman ............. H03B 5/1243
2005/0052272 A1 3/2005 Tiebout
2005/0242915 A1 11/2005 Dolmans et al.
2007/0158782 A1 * 7/2007 Heikkinen .......... H03F 3/45098 257/531

(Continued)

FOREIGN PATENT DOCUMENTS

CN 1949662 A 4/2007
CN 102098003 A 6/2011

(Continued)

*Primary Examiner* — Mang Tin Bik Lian
(74) *Attorney, Agent, or Firm* — Slater Matsil, LLP

(57) ABSTRACT

This application provides an inductor, an oscillator, and a terminal device, and relates to the field of inductor technologies. The inductor includes one primary conductive segment, at least two first conductive sub-segments, and at least one switch. Two ends of the primary conductive segment are respectively connected to two primary ports. At least two taps are disposed on the primary conductive segment. One end of the first conductive sub-segment is connected to one of the taps, and the other end of the first conductive sub-segment is connected to one tap port. The at least one switch includes a first switch disposed between the at least two taps, and/or a second switch disposed on any one or more of the first conductive sub-segments.

19 Claims, 20 Drawing Sheets

01

(56) References Cited

U.S. PATENT DOCUMENTS

| | | | | |
|---|---|---|---|---|
| 2008/0129434 | A1* | 6/2008 | Khajehpour | H01F 21/12 336/200 |
| 2011/0051308 | A1* | 3/2011 | Chan | H01F 21/12 361/268 |
| 2011/0109396 | A1* | 5/2011 | Tanabe | H03B 5/1265 331/117 FE |
| 2012/0154073 | A1* | 6/2012 | Lee | H01F 27/363 334/56 |
| 2013/0082810 | A1* | 4/2013 | Feng | H01F 27/2804 336/145 |
| 2019/0189556 | A1* | 6/2019 | Liang | H10D 84/401 |

FOREIGN PATENT DOCUMENTS

| | | | |
|---|---|---|---|
| CN | 105917464 | A | 8/2016 |
| CN | 105990012 | A | 10/2016 |
| CN | 107408919 | A | 11/2017 |
| CN | 108231743 | A | 6/2018 |
| CN | 108899158 | A | 11/2018 |
| TW | 200950309 | A | 12/2009 |
| WO | 2019190553 | A1 | 10/2019 |

* cited by examiner

INDUCTOR, OSCILLATOR, AND TERMINAL DEVICE

CROSS-REFERENCE TO RELATED APPLICATIONS

This application is a continuation of International Application No. PCT/CN2019/121649, filed on Nov. 28, 2019. the disclosure of which is hereby incorporated by reference in its entirety.

TECHNICAL FIELD

This application relates to the field of inductor technologies, and in particular, to an inductor, an oscillator, and a terminal device.

BACKGROUND

An inductor is an element that can convert electric energy into magnetic energy and store the magnetic energy, and is widely used in integrated circuits for impedance matching, LC resonance, and the like. The inductor is used as a key component in a voltage controlled oscillator (VCO) or a digital controlled oscillator (DCO) in an integrated circuit, and an inductance coverage of the inductor determines a frequency range of the VCO or the DCO to a great extent. With development of communication technologies, a communication apparatus supports an increasing number of modes. Therefore, the frequency range of the VCO or the DCO needs to be continuously increased.

In related technologies, a plurality of VCOs or DCOs are usually disposed in a chip to meet a requirement for a large frequency range of a communication apparatus. However, this may result in a large chip area, which cannot meet a space requirement of chip integration.

SUMMARY

This application provides an inductor, an oscillator, and a terminal device, to resolve a problem that an inductance of an existing inductor is fixed.

According to a first aspect, this application provides an inductor, including: one primary conductive segment, at least two first conductive sub-segments, and at least one switch. The primary conductive segment forms a non-closed loop, and two ends of the primary conductive segment are respectively connected to two primary ports. At least two taps are disposed on the primary conductive segment. One end of the first conductive sub-segment is connected to one of the taps, and the other end of the first conductive sub-segment is connected to one tap port. The at least two first conductive sub-segments and the at least one switch each are located inside the non-closed loop. The at least one switch includes a first switch disposed between the at least two taps, and/or a second switch disposed on any one or more of the first conductive sub-segments.

In the inductor provided in this embodiment of this application, the primary conductive segment is disposed between two primary ports. Inside the non-closed loop formed by the primary conductive segment, the first conductive sub-segment is disposed between the tap port and the tap on the primary conductive segment. In addition, the switch is disposed between the taps on the primary conductive segment and/or on the first conductive segment. Inductances between any two ports of a plurality of ports (including the primary ports and the tap ports) in the inductor can be switched only by controlling on/off of the switch. Therefore, a requirement for a large frequency range of a communication apparatus is met without expanding a chip area.

In a possible implementation, the at least two first conductive sub-segments include two first conductive sub-segments, and the two first conductive sub-segments are respectively connected to different tap ports.

In a possible implementation, the first switch is disposed on a second conductive sub-segment connected between two of the taps. The two first conductive sub-segments are respectively connected to the two taps connected to the second conductive sub-segment.

In a possible implementation, the first switch is disposed on a second conductive sub-segment connected between two of the taps. The two first conductive sub-segments and the second conductive sub-segment are connected to different taps.

In a possible implementation, the at least two first conductive sub-segments include four first conductive sub-segments. The four first conductive sub-segments are divided into a first group and a second group. Two first conductive sub-segments belonging to the first group are connected to one tap port, and two first conductive sub-segments belonging to the second group in the four first conductive sub-segments are connected to another tap port.

In a possible implementation, the two first conductive sub-segments belonging to the first group are connected to one tap port by sharing a part of the conductive segment. The two first conductive sub-segments belonging to the second group are connected to another tap port by sharing a part of the conductive segment.

In a possible implementation, the four first conductive sub-segments are connected to different taps. The first switch is disposed on a second conductive sub-segment connected between two of the taps. One of the first conductive sub-segments belonging to the first group and the second conductive sub-segment are connected to a same tap by sharing a part of the conductive segment. One of the first conductive sub-segments belonging to the second group and the second conductive sub-segment are connected to another tap by sharing a part of the conductive segment.

In a possible implementation, the two first conductive sub-segments belonging to the first group and the two first conductive sub-segments belonging to the second group each are provided with a switch.

In a possible implementation, one of the first conductive sub-segments belonging to the first group and one of the first conductive sub-segments belonging to the second group each are provided with a switch.

In a possible implementation, two of the taps connected to the first switch are connected to different first conductive sub-segments. Alternatively, the two taps connected to the first switch are different from the taps connected to the at least two first conductive sub-segments.

In a possible implementation, the first switch is directly connected to two of the taps. Alternatively, the first switch is disposed on a second conductive sub-segment connected between two of the taps.

In a possible implementation, the non-closed loop is "8"-shaped.

In a possible implementation, the inductor further includes a package layer and an inductor tuning device that is located on the package layer and that is connected to a ground end. The inductor tuning device is a closed coil or a metal shielding pattern.

In a possible implementation, the closed coil is any one of a circle, an ellipse, a quadrangle, a hexagon, or an octagon.

In a possible implementation, the metal shielding pattern is a planar metal pattern or a metal grid pattern.

In a possible implementation, the inductor has an axisymmetric structure.

In a possible implementation, the at least two first conductive sub-segments include two first conductive sub-segments, and the two first conductive sub-segments are symmetrical with each other about an axis of symmetry of the inductor.

In a possible implementation, the two first conductive sub-segments belonging to the first group and the two first conductive sub-segments belonging to the second group are symmetrical with each other about an axis of symmetry of the inductor.

According to a second aspect, this application further provides an inductor, including: two inductor circuits. A first inductor circuit includes one primary conductive segment, at least one first conductive sub-segment, and at least one switch. The first inductor circuit is either of the two inductor circuits. Two ends of the primary conductive segment are respectively connected to two primary ports. At least two taps are disposed on the primary conductive segment. One end of the first conductive sub-segment is connected to one of the taps, and the other end of the first conductive sub-segment is connected to one tap port. The primary conductive segment and the at least one first conductive sub-segment are surrounded to form a non-closed loop. A second conductive sub-segment is connected between the at least two taps. The at least one switch includes a first switch disposed on the second conductive sub-segment, and/or a second switch disposed on any one or more of the first conductive sub-segments. The at least one switch and the second conductive sub-segment are located inside the non-closed loop.

Based on the inductor provided in this embodiment of this application, the two inductor circuits are disposed. In each inductor circuit, the primary conductive segment is disposed between two primary ports. The first conductive sub-segment is disposed between the tap port and the tap on the primary conductive segment. Inside the non-closed loop formed by the primary conductive segment and first conductive sub-segment, the second conductive sub-segment is disposed between two of the taps. In addition the switch is disposed on the first conductive sub-segment and/or the second conductive sub-segment. Inductances between any two ports of a plurality of ports (including the primary ports and the tap ports) in the inductor circuit can be switched only by controlling on/off of the switch. Therefore, a requirement for a large frequency range of a communication apparatus is met without expanding a chip area.

In a possible implementation, the two inductor circuits are distributed axially symmetrically with each other.

In a possible implementation, the at least one first conductive sub-segment includes one first conductive sub-segment. Alternatively, the at least one first conductive sub-segment includes two first conductive sub-segments, and the two first conductive sub-segments are respectively connected to different tap ports. Alternatively, the at least one first conductive sub-segment includes four first conductive sub-segments, and the four first conductive sub-segments are divided into a first group and a second group. Two first conductive sub-segments belonging to the first group are connected to one tap port, and two first conductive sub-segments belonging to the second group are connected to another tap port.

In a possible implementation, the two taps connected to the first switch are connected to different first conductive sub-segments. Alternatively, the two taps connected to the first switch are different from the taps connected to the at least one first conductive sub-segment.

In a possible implementation, the at least one first conductive sub-segment includes two first conductive sub-segments. The two first conductive sub-segments are connected to a same tap port by sharing a part of the conductive segment. One of the two first conductive sub-segments and the second conductive sub-segment are connected to a same tap by sharing a part of the conductive segment.

In a possible implementation, the at least one first conductive sub-segment includes two first conductive sub-segments. The two first conductive sub-segments are connected to different taps and tap ports. The two primary ports are separately a first primary port and a second primary port. A tap connected to one of the first conductive sub-segments is close to the first primary port, and a tap port connected to the first conductive sub-segment is close to the second primary port. A tap connected to the other of the first conductive sub-segments is close to the second primary port, and a tap port connected to the first conductive sub-segment is close to the first primary port.

In a possible implementation, the at least one first conductive sub-segment includes four first conductive sub-segments, and the four first conductive sub-segments are divided into a first group and a second group. Two first partial conductive segments belonging to the first group are connected to a same tap port by sharing a part of the conductive segment. Two first conductive sub-segments belonging to the second group are connected to a same tap port by sharing a part of the conductive segment. One of the first conductive sub-segments belonging to the first group and the second conductive sub-segment are connected to a same tap by sharing a part of the conductive segment. One of the first conductive sub-segments belonging to the second group and the second conductive sub-segment are connected to another tap by sharing a part of the conductive segment. The four first conductive sub-segments are connected to different taps.

In a possible implementation, non-closed loops in the two inductor circuits are "8"-shaped.

In a possible implementation, the inductor further includes a package layer and an inductor tuning device that is located on the package layer and that is connected to a ground end. The inductor tuning device is a closed coil or a metal shielding pattern.

In a possible implementation, the closed coil is any one of a circle, an ellipse, a quadrangle, a hexagon, or an octagon.

In a possible implementation, the metal shielding pattern is a planar metal pattern or a metal grid pattern.

According to a third aspect, an embodiment of this application provides an oscillator, including a control circuit and at least one inductor in any possible implementation of the first aspect and the second aspect. A primary port and a tap port of the inductor are separately connected to the control circuit.

According to a fourth aspect, an embodiment of this application provides a terminal device, including at least one oscillator in any possible implementation of the third aspect.

DETAILED DESCRIPTION OF ILLUSTRATIVE EMBODIMENTS

Technical terms or scientific terms used in this application should have general meanings understood by persons skilled in the art, unless otherwise defined. The terms "first", "second" and similar words used in the specification and claims of this application do not denote any order, quantity or importance, but are merely intended to distinguish between different constituents. Therefore, a feature modified by "first" or "second" may explicitly or implicitly include one or more such features. In the descriptions of embodiments of this application, unless otherwise specified, "a plurality of" means two or more than two. The orientation terms "left", "right", "top" and "bottom" are defined relative to a schematically placed orientation of a switchable inductor in the accompanying drawings. It should be understood that these directional terms are relative concepts and are used to describe and clarify relative to the orientations of the switchable inductors, which may be changed accordingly based on changes in the orientation of the switchable inductor.

The following describes embodiments of this application with reference to the accompanying drawings in embodiments of this application. In the following description, reference is made to the accompanying drawings that form a part of this application and show, byway of illustration, specific aspects of embodiments of this application or specific aspects in which embodiments of this application may be used. It should be understood that embodiments of this application may be used in other aspects, and may include structural or logical changes not depicted in the accompanying drawings. Therefore, the following detailed descriptions shall not be construed as limitative, and the scope of this application is defined by the appended claims. In addition, it should be understood that features of various example embodiments and/or aspects described in this specification may be combined with each other, unless otherwise specified.

An embodiment of this application provides a terminal device. The terminal device may be an electronic product, for example, a mobile phone, a tablet computer, a notebook, a vehicle-mounted computer, a smart watch, or a smart band. A specific form of the terminal device is not specifically limited in this embodiment of this application.

Figure 20:
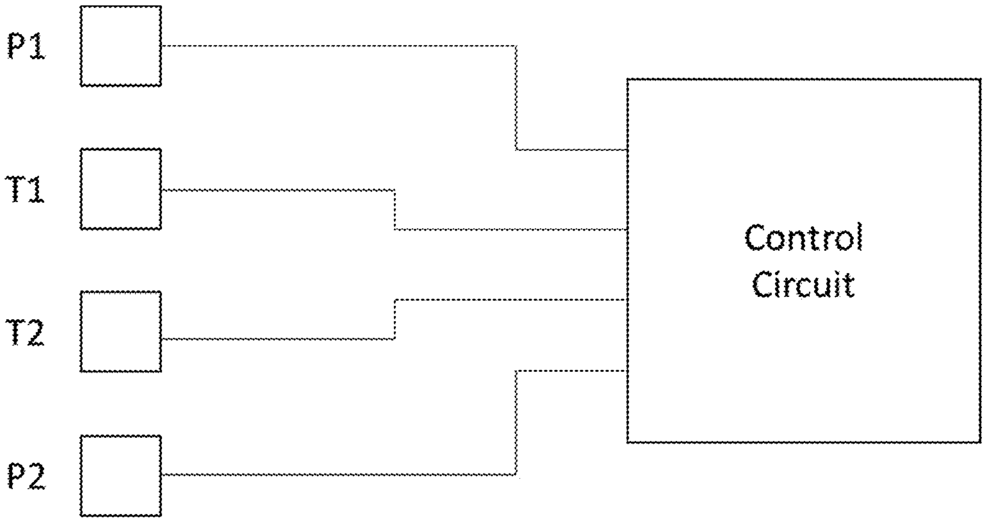
FIG. 20 is a schematic diagram of a structure of a control circuit according to an embodiment of this application.

The terminal device includes an oscillator, and the oscillator includes a control circuit and an inductor connected to the control circuit (see FIG. 20). The control circuit is connected to a port of the inductor. Primary port(s) and tap port(s) of the inductor are separately connected to the control circuit as illustrated by FIG. 20.

The oscillator in this embodiment of this application may be a voltage controlled oscillator (VCO), or may be a digital controlled oscillator (DCO). This is not specifically limited in this application.

The inductor in the oscillator in this application may be switched between a plurality of different inductances, to meet a requirement for a large frequency range of the oscillator (the VCO or the DCO). The following embodiments further describe the inductor in this application.

Figure 1A:
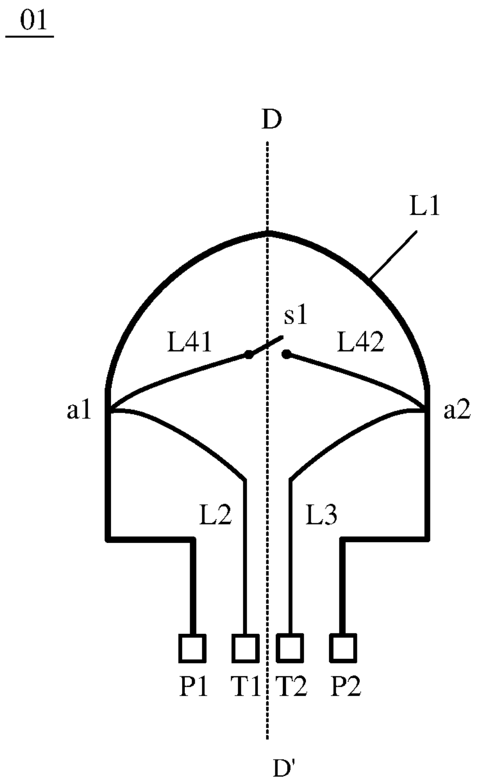
FIG. 1*a* is a schematic diagram of a layout of an inductor according to an embodiment of this application.

An embodiment of this application provides an inductor. Refer to FIG. 1*a*. The inductor o1 includes one primary conductive segment L1, at least two first conductive sub-segments (such as L2 and L3), and at least one switch (such as s1).

In the inductor o1, the primary conductive segment L1 forms a non-closed loop. In some possible implementations, to ensure that the inductor has a good anti-interference capability, the primary conductive segment L1 may be set to have an axisymmetric structure. In this case, the primary conductive segment L1 may be bent from a middle position to form an axisymmetric non-closed loop, for example, the non-closed loop, shown in FIG. 1*a*, symmetrical along an axis of symmetry DD'. The following embodiments are described by using an example in which the inductor o1 has an axisymmetric structure.

The at least two first conductive sub-segments (such as L2 and L3) and the at least one switch (such as s1) each are disposed inside the non-closed loop, to ensure that the inductor o1 has a small area (that is, a chip disposed with the inductor o1 has a small area). A specific shape of the non-closed loop formed by the primary conductive segment L1 is not limited in this application.

As shown in FIG. 1*a*, one end of the primary conductive segment L1 is connected to a first primary port P1, and the other end thereof is connected to a second primary port P2. In addition, at least two taps (such as a1 and a2) are disposed on the primary conductive segment L1. One end of the first conductive sub-segment (L2 or L3) is connected to one tap, and the other end of the first conductive sub-segment (L2 or L3) is connected to one tap port (for example, T1 or T2).

Further, the at least one switch disposed in the inductor o1 includes a switch disposed between the at least two taps (such as a1 and a2) and/or a switch disposed on any one or more first conductive sub-segments. It should be understood herein that a quantity of switches is not specifically limited in this application, and may be selected based on a quantity of taps, a quantity of first conductive sub-segments, and an actual requirement.

It should be noted that the term "and/or" in this application merely describes associations between associated objects, and it indicates three types of relationships. For example, A and/or B may indicate that A exists alone, A and B coexist, or B exists alone. In addition, in this specification, a character "/" generally indicates an "or" relationship between a former and a latter associated objects.

For example, that the at least one switch disposed in the inductor o1 includes a switch disposed between the at least two taps (such as a1 and a2) and/or a switch disposed on any one or more first conductive sub-segments may be understood that: the switch in the inductor o1 may include only the switch disposed between the at least two taps (such as a1 and a2), or may include only the switch disposed on any one or more first conductive sub-segments (such as L2 and L3), or may include each of the switch disposed between the at least two taps (such as a1 and a2) and the switch disposed on any one or more first conductive sub-segments (such as L2 and L3).

In conclusion, based on the inductor provided in this embodiment of this application, the primary conductive segment is disposed between the two primary ports. Inside the non-closed loop formed by the primary conductive segment, the first conductive sub-segment is disposed between the tap port and the tap. The switch is disposed between the taps on the primary conductive segment and/or on the first conductive segment. Inductances between any two ports of a plurality of ports (including the primary ports and the tap ports) in the inductor can be switched only by controlling on/off of the switch. Therefore, a requirement for a large frequency range of a communication apparatus is met without expanding a chip area.

The following further describes the inductor o1 in this application by using specific embodiments.

Embodiment 1

Figure 1B:
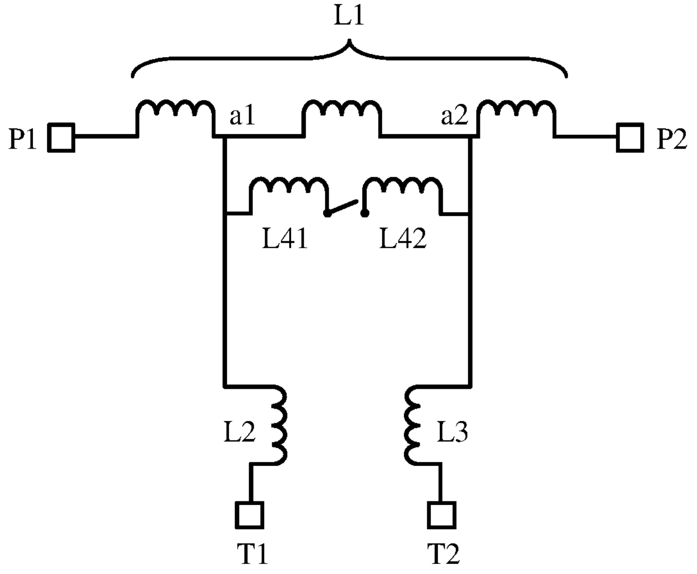
FIG. 1*b* is a schematic diagram of an equivalent circuit of the inductor in FIG. 1*a;*

FIG. 1*a* is a schematic diagram of a layout of an inductor o1 according to an embodiment. FIG. 1*b* is an equivalent circuit diagram of FIG. 1*a*. Refer to FIG. 1*a* and FIG. 1*b*. In the inductor o1 provided in this embodiment, a primary conductive segment L1 bends from a middle position to form an axisymmetric non-closed loop, one end of the primary conductive segment L1 is connected to a first primary port P1, and the other end thereof is connected to a second primary port P2. Schematically, the primary conductive segment L1 may use a high-layer wide metal routine line.

The inductor o1 further includes two first conductive sub-segments L2 and L3, and the two first conductive sub-segments L2 and L3 are disposed symmetrically with each other on an axis of symmetry DD' of the non-closed loop. One end of the first conductive sub-segment L2 is connected to a tap a1, and the other end thereof is connected to a tap port T1. One end of the first conductive sub-segment L3 is connected to a tap a2, and the other end thereof is connected to a tap port T2. Schematically, the tap port T1 and the tap port T2 may be distributed side by side with the first primary port P1 and the second primary port P2 in a direction of the vertical axis of symmetry DD'.

In addition, the inductor o1 may further include a second conductive sub-segment disposed between the tap a1 and the tap a2. A switch s1 is disposed on the second conductive sub-segment, that is, in this case, the second conductive sub-segment includes two conductive segments L41 and L42. The conductive segment L41 is connected to the tap a1, the conductive segment L42 is connected to the tap a2, and the two conductive segments L41 and L42 are connected by using the switch s1. Schematically, the conductive segment L41 and the conductive segment L42 may be disposed symmetrically with each other about the axis of symmetry DD'.

In some possible implementations, there may be no switch disposed on the second conductive sub-segment, that is, the tap a1 is directly connected to the tap a2 through a complete second conductive sub-segment. In this case, switches may be separately disposed on the first conductive sub-segment L2 and the first conductive sub-segment L3, to implement inductance switching of the inductor. Schematically, the switch on the first conductive sub-segment L2 and the switch on the first conductive sub-segment L3 may be disposed symmetrically with each other about the axis of symmetry DD'.

In this embodiment, by using the inductor o1 provided in this embodiment, inductances between any two ports in the first primary port P1, the second primary port P2, and the two tap ports T1 and T2 can be switched by controlling on/off of the switch s1.

Schematically, when the switch s1 is controlled to be open (that is, the conductive segment L41 is weakly connected to the conductive segment L42, and a conduction impedance is greater than 100 ohm), there is an inductance between any two ports of the first primary port P1, the second primary port P2, and the two tap ports T1 and T2. When the switch s1 is controlled to be closed (that is, the conductive segment L41 is strongly connected to the conductive segment L42, and a conduction impedance is less than 5 ohm), the conductive segment L41 and the conductive segment L42 are coupled to the primary conductive segment L1, and the inductance between any two ports of the first primary port P1, the second primary port P2, and the two tap ports T1 and T2 is switched to another inductance. That is, there are at least two different inductances between any two ports in the inductor o1 provided in this embodiment. Therefore, when the inductor o1 is applied to a VCO or a DCO, a large frequency range can be covered.

Embodiment 2

Figure 2:
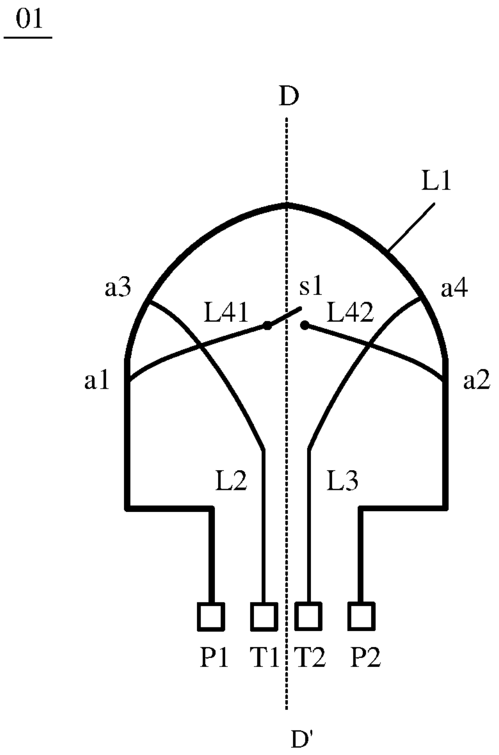
FIG. 2 is a schematic diagram of a layout of an inductor according to an embodiment of this application.

FIG. 2 is a schematic diagram of a layout of an inductor o1 according to an embodiment. In Embodiment 1, the first conductive sub-segment L2 and the conductive segment L41 are connected to the same tap a1, and the first conductive sub-segment L3 and the conductive segment L42 are connected to the same tap a2. Refer to FIG. 2. Different from the inductor o1 in Embodiment 1, for the inductor o1 in this embodiment, a first conductive sub-segment L2 and a conductive segment L41 are connected to different taps, and a first conductive sub-segment L3 and a conductive segment L42 are connected to different taps. As shown in FIG. 2, the second conductive sub-segments (L41 and L42) are connected between a tap a1 and a tap a2. The first conductive sub-segment L2 is connected to a third primary tap a3 on a primary conductive segment L1. The first conductive sub-segment L3 is connected to a fourth primary tap a4 on the primary conductive segment L1.

In this embodiment, inductances between any two ports in a first primary port P1, a second primary port P2, and two tap ports T1 and T2 can be switched by controlling on/off of a switch s1, so that when the inductor o1 is applied to a VCO or a DCO, a large frequency range can be covered.

Embodiment 3

Figure 3A:
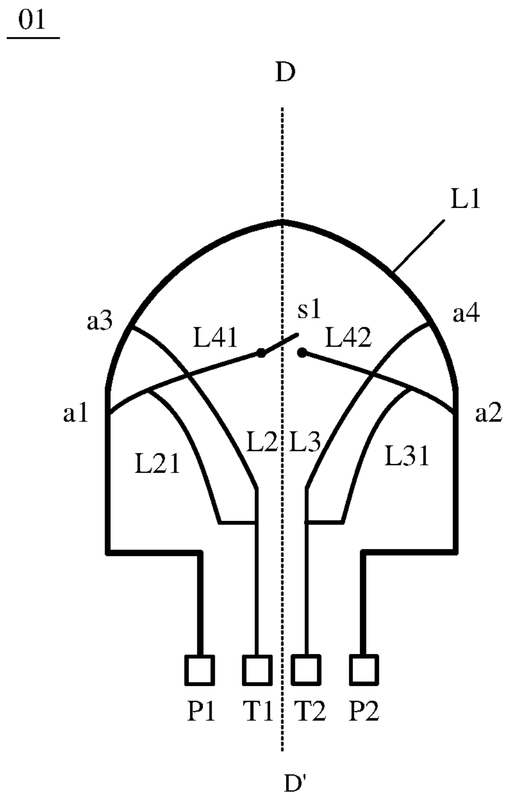
FIG. 3*a* is a schematic diagram of a layout of an inductor according to an embodiment of this application.
Figure 3B:
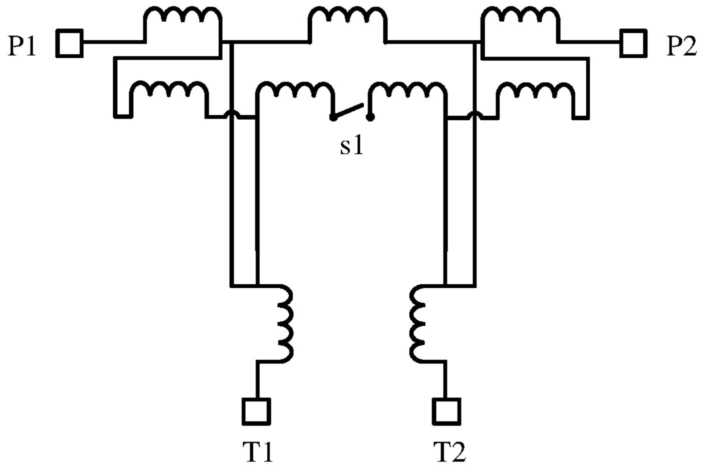
FIG. 3*b* is a schematic diagram of an equivalent circuit of the inductor in FIG. 3*a;*

FIG. 3*a* is a schematic diagram of a layout of an inductor o1 according to an embodiment. FIG. 3*b* is an equivalent circuit diagram of FIG. 3*a*. Refer to FIG. 3*a* and FIG. 3*b*. Different from the inductor o1 in Embodiment 2, in addition to a first conductive sub-segment L2 and a first conductive sub-segment L3, the inductor o1 provided in this embodiment further includes a first conductive sub-segment L21 and a first conductive sub-segment L31. That is, the inductor o1 includes four first conductive sub-segments L2, L3, L21, and L31.

The first conductive sub-segment L21 and the first conductive sub-segment L31 are disposed symmetrically with each other about an axis of symmetry DD'. One end of the first conductive sub-segment L21 is connected to a tap a1, and the other end thereof is connected to a tap port T1. One end of the first conductive sub-segment L31 is connected to a tap a2, and the other end thereof is connected to a tap port T2.

FIG. 3*a* is merely a schematic diagram for description by using an example in which the first conductive sub-segment L21 and a conductive segment L41 are connected to the same tap a1, the first conductive sub-segment L31 and a conductive segment L42 are connected to the same tap a2, the first conductive sub-segment L21 and the first conductive sub-segment L2 are connected to the same tap port T1, and the first conductive sub-segment L31 and the first conductive sub-segment L3 are connected to the same tap port T2.

The following describes a case in which the first conductive sub-segment L21 and the conductive segment L41 are connected to the same tap a1, and the first conductive sub-segment L31 and the conductive segment L42 are connected to the same tap a2.

In some possible implementations, as shown in FIG. 3*a*, the first conductive sub-segment L21 may be directly connected to the conductive segment L41, that is, the first conductive sub-segment L21 and the conductive segment L41 are connected to the tap a1 by sharing a part of the conductive segment. The first conductive sub-segment L31 may be directly connected to the conductive segment L42, that is, the first conductive sub-segment L31 and the conductive segment L42 are connected to the tap a2 by sharing a part of the conductive segment.

In some possible implementations, the first conductive sub-segment L21 and the conductive segment L41 may be separately connected to the tap a1 independently. The first conductive sub-segment L31 and the conductive segment L42 may be separately connected to the tap a2 independently.

Figure 7:
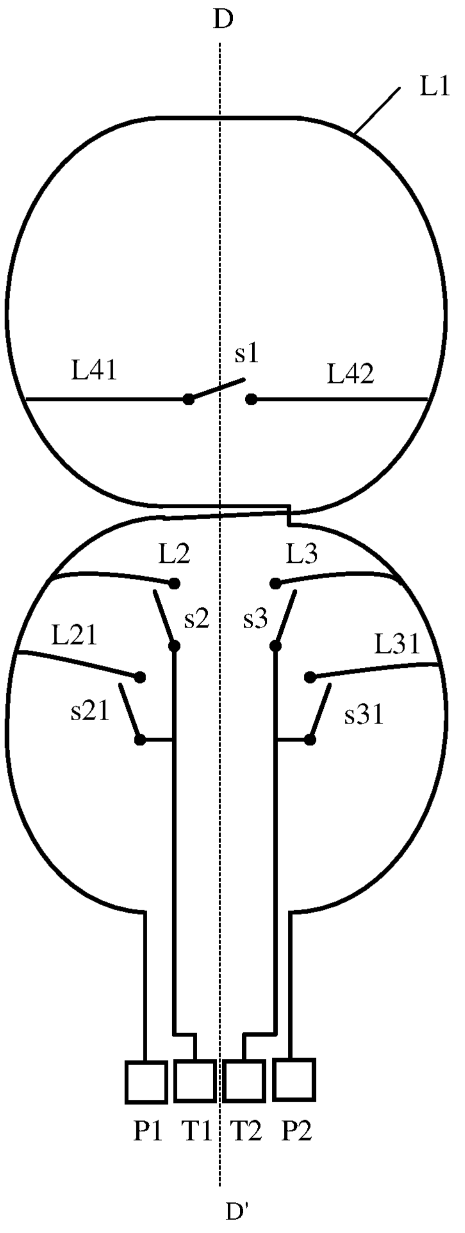
FIG. 7 is a schematic diagram of a layout of an inductor according to an embodiment of this application.
Figure 8:
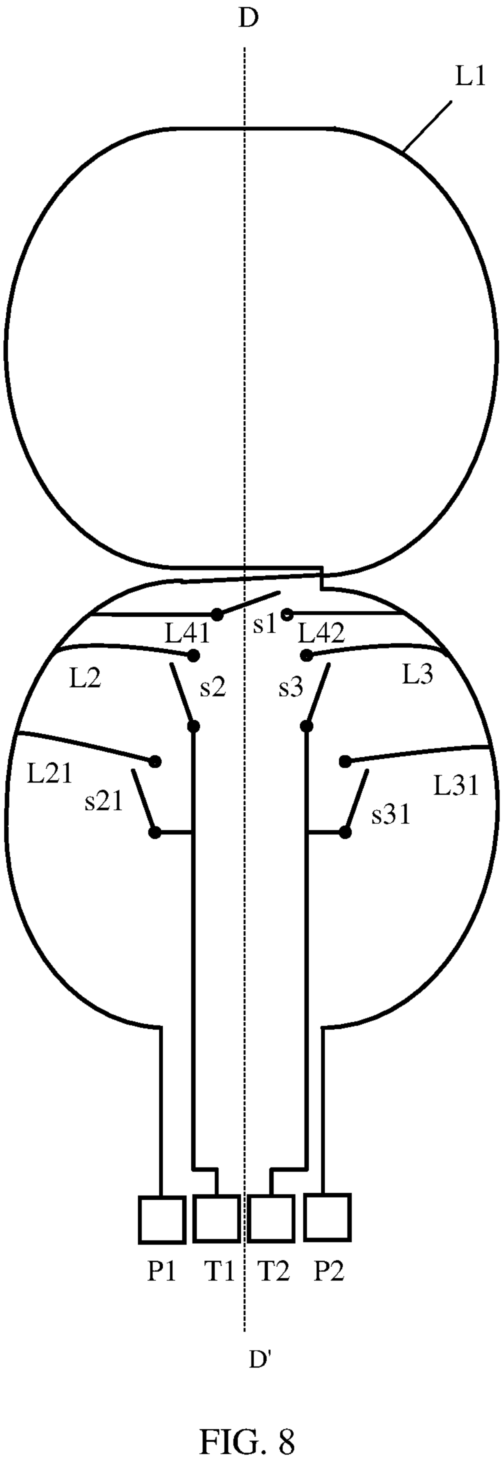
FIG. 8 is a schematic diagram of a layout of an inductor according to an embodiment of this application.

Certainly, in some other possible implementations, with reference to FIG. 7 or FIG. 8, the first conductive sub-segment L21 and the conductive segment L41 may be separately connected to different taps, and the first conductive sub-segment L31 and the conductive segment L42 may be separately connected to different taps.

The following describes a case in which the first conductive sub-segment L21 and the first conductive sub-segment L2 are connected to the same tap port T1, and the first conductive sub-segment L31 and the first conductive sub-segment L3 are connected to the same tap port T2.

In some possible implementations, as shown in FIG. 3*a*, the first conductive sub-segment L21 may be directly connected to the first conductive sub-segment L2, that is, the first conductive sub-segment L21 and the first conductive sub-segment L2 are connected to the tap port T1 by sharing a part of the conductive segment. The first conductive sub-segment L31 may be directly connected to the first conductive sub-segment L3, that is, the first conductive sub-segment L31 and the first conductive sub-segment L3 are connected to the tap port T2 by sharing a part of the conductive segment.

In some possible implementations, the first conductive sub-segment L21 and the first conductive sub-segment L2 may be separately connected to the same tap port T1 independently. The first conductive sub-segment L31 and the first conductive sub-segment L3 are separately connected to the same tap port T2 independently.

Certainly, in some other possible implementations, the first conductive sub-segment L21 and the first conductive sub-segment L2 may be connected to different tap ports, and the first conductive sub-segment L31 and the first conductive sub-segment L3 may be connected to different tap ports. Thus, four tap ports are disposed in the inductor o1.

In this embodiment, a plurality of inductances between any two ports in a first primary port P1, a second primary port P2, and the two tap ports T1 and T2 can be switched by controlling on/off of a switch s1, so that when the inductor o1 is applied to a VCO or a DCO, a large frequency range can be covered.

Embodiment 4

Figure 4A:
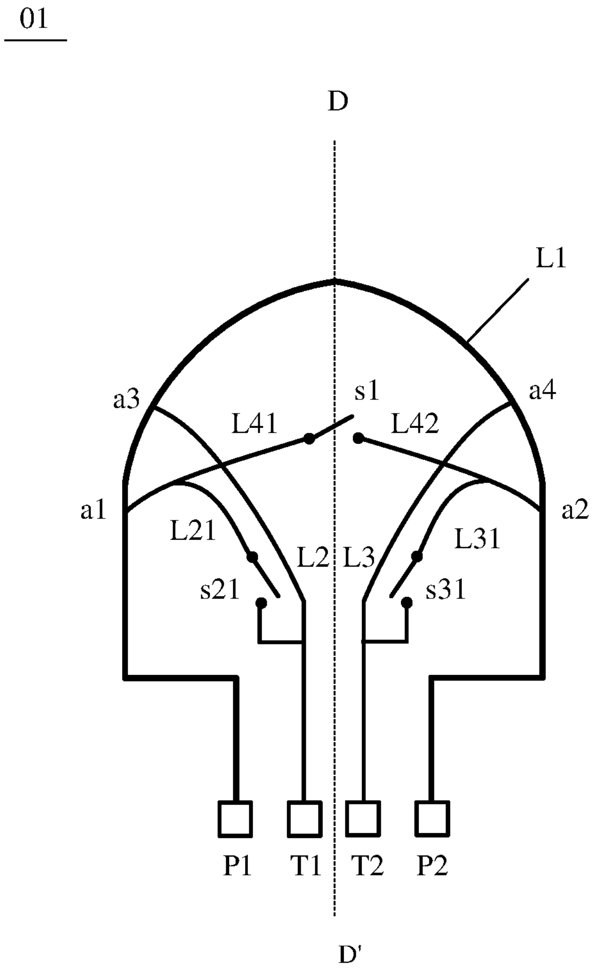
FIG. 4*a* is a schematic diagram of a layout of an inductor according to an embodiment of this application.
Figure 4B:
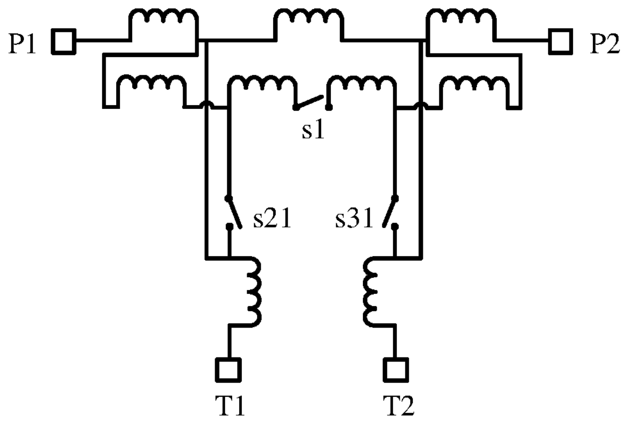
FIG. 4*b* is a schematic diagram of an equivalent circuit of the inductor in FIG. 4*a;*

FIG. 4*a* is a schematic diagram of a layout of an inductor o1 according to an embodiment. FIG. 4*b* is an equivalent circuit diagram of FIG. 4*a*. Refer to FIG. 4*a* and FIG. 4*b*. Different from the inductor o1 in Embodiment 3, for the inductor o1 provided in this embodiment, a switch s21 is disposed on a first conductive sub-segment L21, and a switch s31 is disposed on a first conductive sub-segment L31. Schematically, the switch s21 and the switch s31 may be disposed symmetrically with each other about an axis of symmetry DD'.

In this embodiment, a plurality of inductances between any two ports in a first primary port P1, a second primary port P2, and two tap ports T1 and T2 can be switched by controlling on/off of a switch s1, the switch s21, and the switch s31, so that when the inductor o1 is applied to a VCO or a DCO, a large frequency range can be covered.

It should be noted that, to ensure an anti-interference capability of the inductor o1, two switches (for example, the switch s21 and the switch s31) in the inductor o1 that are disposed symmetrically with each other about the axis of symmetry DD' can be controlled to turn on or off simultaneously. Schematically, s1 may be controlled to turn on, and the switch s21 and the switch s31 may be controlled to turn off. Alternatively, the switch s21 and the switch s31 may be controlled to turn on, and s1 may be controlled to turn off. Alternatively, s1 may be controlled to turn on, and the switch s21 and the switch s31 may be controlled to turn on.

Embodiment 5

Figure 5A:
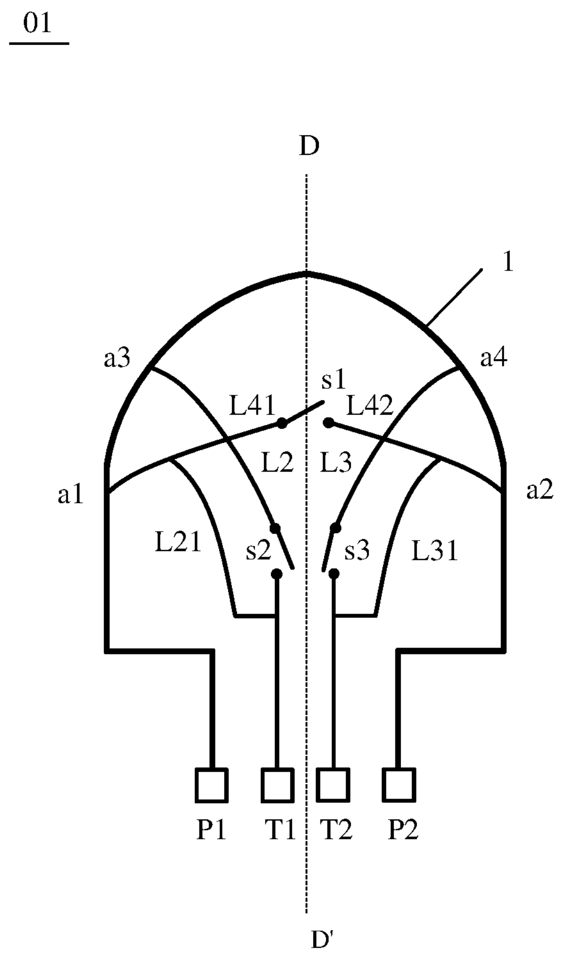
FIG. 5*a* is a schematic diagram of a layout of an inductor according to an embodiment of this application.
Figure 5B:
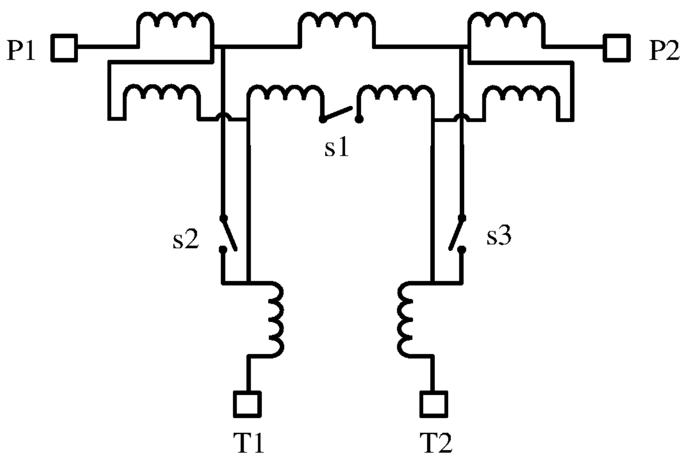
FIG. 5*b* is a schematic diagram of an equivalent circuit of the inductor in FIG. 5*a;*

FIG. 5*a* is a schematic diagram of a layout of an inductor o1 according to an embodiment. FIG. 5*b* is an equivalent circuit diagram of FIG. 5*a*. Refer to FIG. 5*a* and FIG. 5*b*. Different from the inductor o1 in Embodiment 3, for the inductor o1 provided in this embodiment, a switch s2 is disposed on a first conductive sub-segment L2, and a switch s3 is disposed on a first conductive sub-segment L3. Schematically, the switch s2 and the switch s3 may be disposed symmetrically with each other about an axis of symmetry DD'.

In this embodiment, a plurality of inductances between any two ports in a first primary port P1, a second primary port P2, and two tap ports T1 and T2 can be switched by controlling on/off of a switch s1, the switch s2, and the switch s3, so that when the inductor o1 is applied to a VCO or a DCO, a large frequency range can be covered. Schematically, s1 may be controlled to turn on, and the switch s2 and the switch s3 may be controlled to turn off. Alternatively, the switch s2 and the switch s3 may be controlled to turn on, and s1 may be controlled to turn off. Alternatively, s1 may be controlled to turn on, and the switch s2 and the switch s3 may be controlled to turn on.

Embodiment 6

Figure 6A:
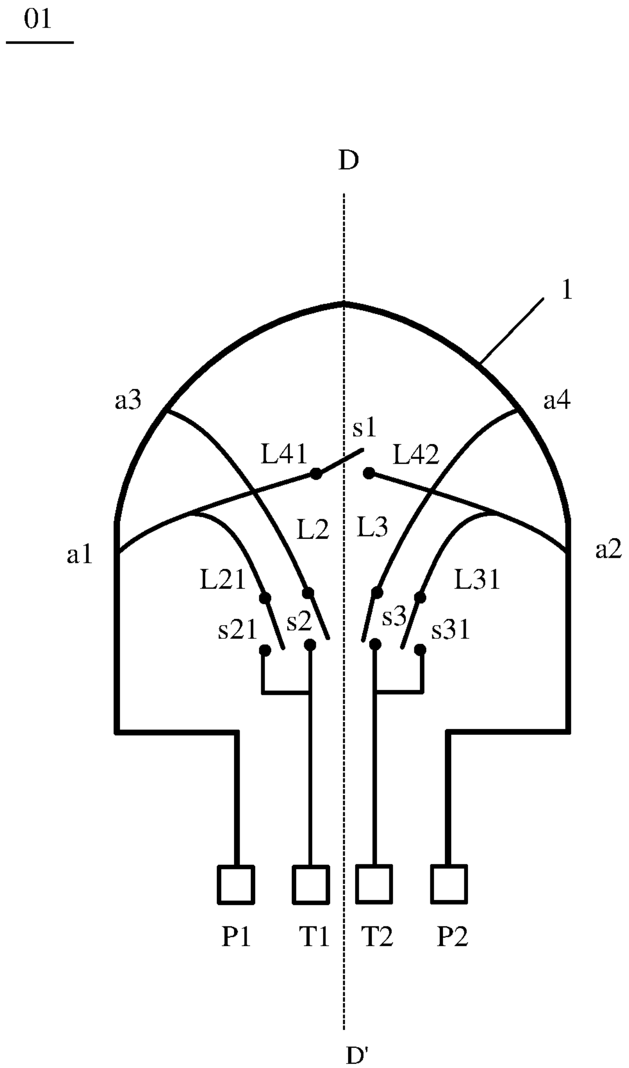
FIG. 6*a* is a schematic diagram of a layout of an inductor according to an embodiment of this application.
Figure 6B:
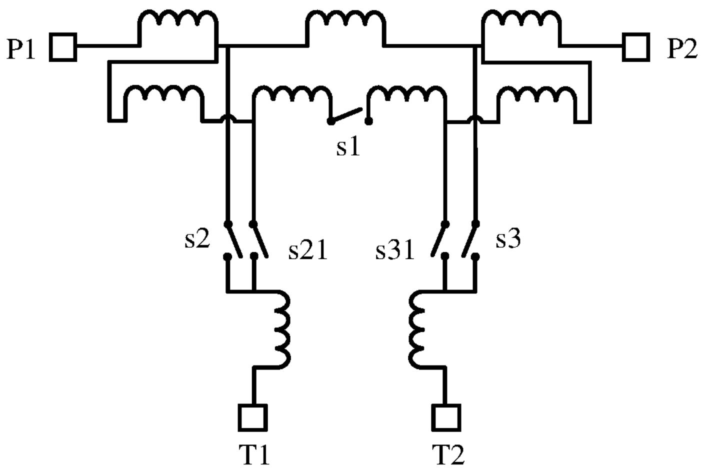
FIG. 6*b* is a schematic diagram of an equivalent circuit of the inductor in FIG. 6*a;*

FIG. 6*a* is a schematic diagram of a layout of an inductor o1 according to an embodiment. FIG. 6*b* is an equivalent circuit diagram of FIG. 6*a*. Refer to FIG. 6*a* and FIG. 6*b*. Different from the inductor o1 in Embodiment 3, for the inductor o1 provided in this embodiment, a switch s2 is disposed on a first conductive sub-segment L2, a switch s3 is disposed on a first conductive sub-segment L3, a switch s21 is disposed on a first conductive sub-segment L21, and a switch s31 is further disposed on a first conductive sub-segment L31. Schematically, the switch s2 and the switch s3 may be disposed symmetrically with each other about an axis of symmetry DD'. The switch s21 and the switch s31 may be disposed symmetrically with each other about the axis of symmetry DD'.

In this embodiment, a plurality of inductances between any two ports in a first primary port P1, a second primary port P2, and two tap ports T1 and T2 can be switched by controlling on/off of a switch s1, the switch s2, the switch s3, the switch s21, and the switch s3*i*, so that when the inductor o1 is applied to a VCO or a DCO, a large frequency range can be covered. Schematically, the switch s1 may be controlled to turn on, the switch s2 and the switch s3 may be controlled to turn on, and the switch s21 and the switch s31 may be controlled to turn off. Alternatively, the switch s1 may be controlled to turn on, the switch s2 and the switch s3 may be controlled to turn off, and the switch s21 and the switch s31 may be controlled to turn on. Alternatively, the switch s1 may be controlled to turn off, the switch s2 and the switch s3 may be controlled to turn on, and the switch s21 and the switch s31 may be controlled to turn on.

Further, in order to implement that when the inductor o1 is applied to an oscillator, there is little impact between the inductor o1 and another circuit element, in some embodiments, the non-closed loop formed by the primary conductive segment L1 in the above embodiments (including Embodiment 1, Embodiment 2, Embodiment 3, Embodiment 4, Embodiment 5, and Embodiment 6) may be set to an "8" shape. Therefore, two ends of the "8"-shaped inductor o1 generate magnetic fields in opposite directions, which can cancel each other, to avoid a large impact between the inductor o1 and the another circuit element.

Certainly, it should be noted herein that an "8" shape in this application is only similar to "8" in shape. The "8" shape in this application is formed by a non-closed loop, that is, the "8" shape in this application is a non-closed loop structure, and is not a closed structure formed by "8". In other words, at least one of two rings (an upper ring and a lower ring) in the "8" shape of this application is unclosed.

Schematically, the inductor o1 in Embodiment 4 is used as an example. As shown in FIG. 7 or FIG. 8, the non-closed loop formed by the primary conductive segment L1 in the inductor o1 may be set to be "8"-shaped. Other conductive segments (including a first conductive sub-segment and a second conductive sub-segment) and the switch in the inductor o1 are set without specific limitation, and may be set as required in practice.

For example, as shown in FIG. 7, the second conductive sub-segments (that is, the conductive segment L41 and the conductive segment L42) and the switch s1 located on the second conductive sub-segment may be disposed in an upper ring of the "8"-shaped structure. The first conductive sub-segments L2, L3, L21, and L31 and the switches s2, s3, s21, and s31 disposed on the first conductive sub-segments L2, L3, L21, and L31 are disposed in a lower ring of the "8"-shaped structure.

For another example, as shown in FIG. 8, the second conductive sub-segments (that is, the conductive segment L41 and the conductive segment L42), the switch s1 located on the second conductive sub-segment, the first conductive sub-segments L2, L3, L21, L31, and the switches s2, s3, s21, and s31 disposed on the first conductive sub-segments L2, L3, L21, and L31 each may be disposed in a lower ring of the "8"-shaped structure.

For the "8"-shaped inductor o1 in FIG. 7 and FIG. 8, the second conductive sub-segments (that is, the conductive segment L41 and the conductive segment L42) are disposed between two taps, and the switch s1 is disposed on the second conductive sub-segment. In addition, compared with that, in another possible implementation, a switch may be directly disposed between two taps, and there is no need to use a second conductive sub-segment.

Figure 9A:
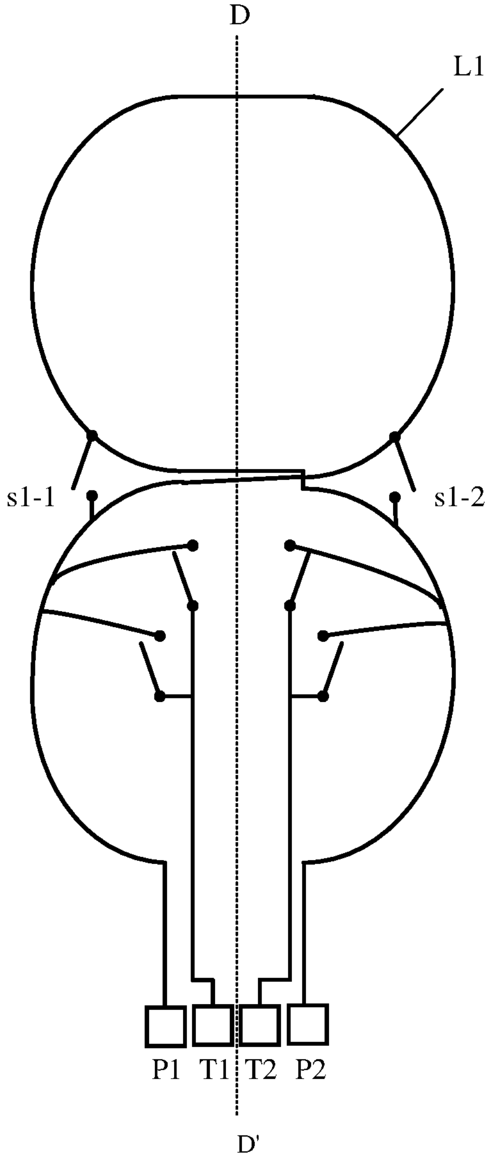
FIG. 9*a* is a schematic diagram of a layout of an inductor according to an embodiment of this application.
Figure 9B:
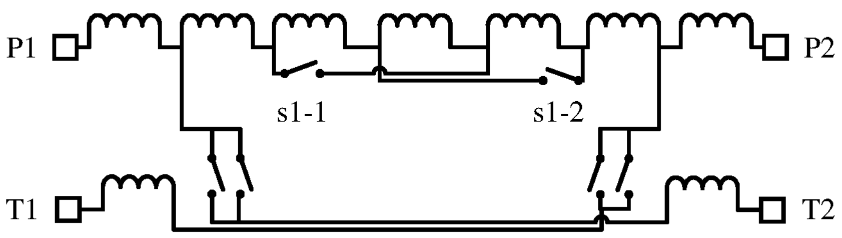
FIG. 9*b* is a schematic diagram of an equivalent circuit of the inductor in FIG. 9*a;*

Schematically, as shown in FIG. 9*a* and FIG. 9*b* (being the equivalent circuit in FIG. 9*a*), in the left half of the "8"-shaped structure, taps may be separately disposed in regions adjacent to an upper ring and a lower ring, and two taps are directly connected through a switch s1-1. In the right half of the "8"-shaped structure, taps may be separately set in regions adjacent to the upper ring and the lower ring, and two taps are directly connected through a switch s1-2. Certainly, in this case, a first conductive sub-segment and a switch disposed on the first conductive sub-segment are set without specific limitation, and may be set as required in practice. For example, refer to related settings in FIG. 7 and FIG. 8.

Figure 10A:
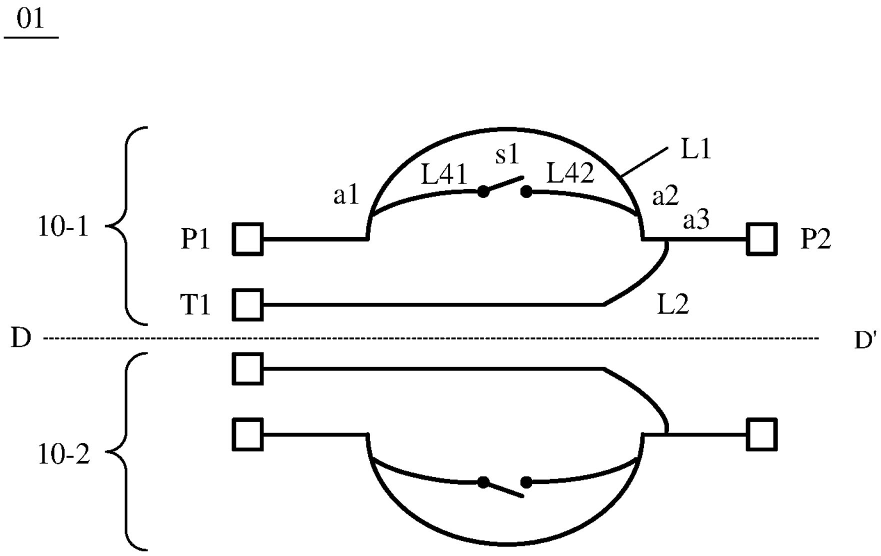
FIG. 10*a* is a schematic diagram of a layout of an inductor according to an embodiment of this application.

An embodiment of this application further provides an inductor o1. Refer to FIG. 10*a*. The inductor o1 includes two inductor circuits 10-1 and 10-2. In some possible implementations, to ensure that the inductor has a good anti-interference capability, the inductor o1 may be set to have an axisymmetric structure. In this case, the two inductor circuits 10-1 and 10-2 are distributed axially symmetrically with each other (that is, the two inductor circuits 10-1 and 10-2 are distributed symmetrically with each other about a symmetry axis DD'), and further structures (including a circuit and a layout) of the two inductor circuits 10-1 and 10-2 are completely consistent. In the following embodiments, the two inductor circuits 10-1 and 10-2 are distributed axially symmetrically with each other, and any one of the two inductor circuits 10-1 and 10-2 (for example, the inductor circuit 10-1) is used as an example to further describe an inductor circuit in this application.

As shown in FIG. 10*a*, the inductor circuit 10-1 includes one primary conductive segment L1, at least one first conductive sub-segment (such as L2), and at least one switch (such as s1). The primary conductive segment L1 and the at least one first conductive sub-segment (L2) are surrounded to form a non-closed loop. A specific shape of the non-closed loop formed by the primary conductive segment L1 and the at least one first conductive sub-segment (L2) is not limited in this application.

One end of the primary conductive segment L1 is connected to a first primary port P1, and the other end thereof is connected to a second primary port P2. In addition, at least two taps (such as a1, a2, and a3) are disposed on the primary conductive segment L1. One end of the first conductive sub-segment (L2) is connected to one tap, and the other end of the first conductive sub-segment (L2) is connected to one tap port (for example, T1). The second conductive sub-segments (such as L41 and L42) are connected between the at least two taps (such as a1 and a2). The second conductive sub-segments (such as L41 and L42) and the at least one switch (such as s1) each are disposed inside the non-closed loop, to ensure that the inductor o1 has a small area (that is, a chip disposed with the inductor o1 has a small area).

Further, the at least one switch disposed in the inductor circuit 10-1 includes a switch disposed on the second conductive sub-segment and/or a switch disposed on any one or more first conductive sub-segments. It should be understood herein that a quantity of switches is not specifically limited in this application, and may be selected based on a quantity of taps, a quantity of first conductive sub-segments, and an actual requirement.

For example, that the at least one switch disposed in the inductor circuit 10-1 includes a switch disposed on the second conductive sub-segment and/or a switch disposed on any one or more first conductive sub-segments may be understood that: the switch in the inductor circuit 10-1 may include only the switch disposed on the second conductive sub-segment, or include only the switch disposed on any one or more first conductive sub-segments, or include each of the switch disposed on the second conductive sub-segment and the switch disposed on any one or more first conductive sub-segments.

In conclusion, based on the inductor provided in this embodiment of this application, the two inductor circuits are disposed. In each inductor circuit, the primary conductive segment is disposed between the two primary ports. The first conductive sub-segment is disposed between the tap port and the tap on the primary conductive segment. Inside the non-closed loop formed by the primary conductive segment and first conductive sub-segment, the second conductive sub-segment is disposed between the two taps. In addition the switch is disposed on the first conductive sub-segment and/or the second conductive sub-segment. Inductances between any two ports of a plurality of ports (including the primary ports and the tap ports) in the inductor circuit can be switched only by controlling on/off of the switch. Therefore, a requirement for a large frequency range of a communication apparatus is met without expanding a chip area.

The following further describes the inductor circuit 10-1 by using specific embodiments.

Embodiment 7

Figure 10B:
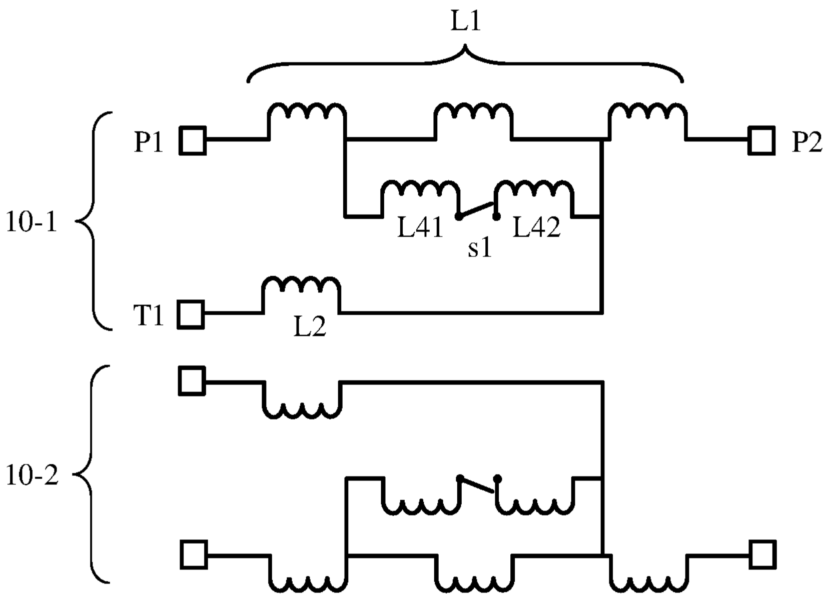
FIG. 10*b* is a schematic diagram of an equivalent circuit of the inductor in FIG. 10*a;*

FIG. 10*a* is a schematic diagram of a layout of an inductor o1 according to an embodiment. FIG. 10*b* is an equivalent circuit diagram of FIG. 10*a*. Refer to FIG. 10*a* and FIG. 10*b*. In the inductor circuit 10-1 in the inductor o1 in this embodiment, one end of a primary conductive segment L1 is connected to a first primary port P1, and the other end thereof is connected to a second primary port P2.

One first conductive sub-segment L2 is disposed in the inductor circuit 10-1. The primary conductive segment L1 bends from a middle position to form a convex structure. One end of the first conductive sub-segment L2 is connected to a tap a3 close to the second primary port P2, and the other end of the first conductive sub-segment L2 is connected to a tap port T1 close to the first primary port P1. The primary conductive segment L1 and the first conductive sub-segment L2 form a non-closed loop. Schematically, the tap port T1 and the first primary port P1 may be distributed side by side in a direction of a vertical axis of symmetry DD'.

In addition, as shown in FIG. 10*a*, a tap a1 and a tap a2 are disposed on the convex structure of the primary conductive segment L1, and the tap a1 is closer to the first primary port P1 than the tap a2. The inductor circuit 10-1 further includes a second conductive sub-segment disposed between the tap a1 and the tap a2. The second conductive sub-segment includes two conductive segments L41 and L42. The conductive segment L41 is connected to the tap a1, the conductive segment L42 is connected to the tap a2, and the two conductive segments L41 and L42 are connected through a switch s1.

In some possible implementations, there may be no switch disposed on the second conductive sub-segment, that is, the tap a1 is directly connected to the tap a2 through a complete second conductive sub-segment. In this case, a switch may be disposed on the first conductive sub-segment L2, to implement inductance switching of the inductor circuit.

In the inductor circuit 10-1 provided in this embodiment, inductances between any two ports of the first primary port P1, the second primary port P2, and the tap port T1 in the inductor circuit 10-1 can be switched by controlling on/off of the switch s1. Similarly, the inductor circuit 10-2 has the same structure.

Schematically, when the switch s1 is controlled to be open (that is, the conductive segment L41 is weakly connected to the conductive segment L42, and a conduction impedance is greater than 100 ohm), there is an inductance between any two ports of the first primary port P1, the second primary port P2, and the tap port T1. When the switch s1 is controlled to be closed (that is, the conductive segment L41 is strongly connected to the conductive segment L42, and a conduction impedance is less than 5 ohm), the conductive segment L41 and the conductive segment L42 are coupled to the primary conductive segment L1, and the inductance between any two ports of the first primary port P1, the second primary port P2, and the tap port T1 is switched to another inductance. That is, there are at least two different inductances between any two ports in the inductor o1 provided in this embodiment. Therefore, when the inductor o1 is applied to a VCO or a DCO, a large frequency range can be covered.

It should be noted that, in an actual control process, two switches disposed symmetrically with each other about the axis of symmetry DD' that are in the inductor circuit 10-1 and the inductor circuit 10-2 may be controlled to be on or off simultaneously, to ensure an anti-interference capability of the inductor o1.

Embodiment 8

Figure 11A:
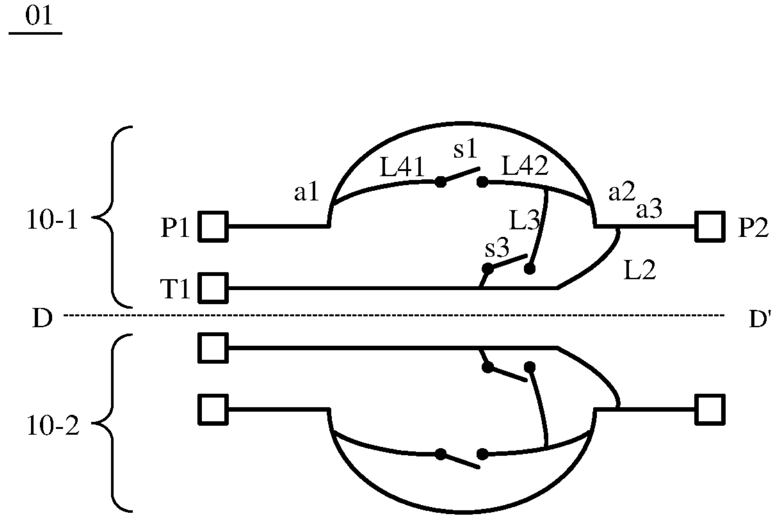
FIG. 11*a* is a schematic diagram of a layout of an inductor according to an embodiment of this application.
Figure 11B:
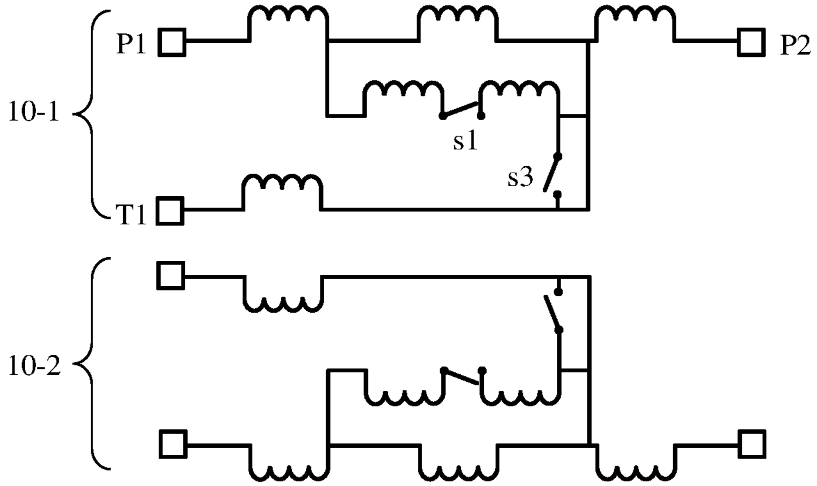
FIG. 11*b* is a schematic diagram of an equivalent circuit of the inductor in FIG. 11*a;*

FIG. 11a is a schematic diagram of a layout of an inductor o1 according to an embodiment. FIG. 11b is an equivalent circuit diagram of FIG. 11a. In Embodiment 7, the first conductive sub-segment L2 is disposed and connected between the tap a3 and the tap port T1. Compared with that, as shown in FIG. 11a, in addition to a first conductive sub-segment L2, the inductor o1 provided in this embodiment is further disposed with another first conductive sub-segment L3 connected between a tap a2 and a tap port T1. That is, two first conductive sub-segments L2 and L3 are disposed in this embodiment.

As shown in FIG. 11a, a switch s3 may be disposed on the first conductive sub-segment L3. In another possible implementation, there may be no switch disposed on the first conductive sub-segment L3, that is, the tap a2 is connected to the tap port T1 through a complete first conductive sub-segment L3.

The following describes a case in which the first conductive sub-segment L3 and a conductive segment L42 are connected to the same tap a2.

In some possible implementations, as shown in FIG. 11a, the first conductive sub-segment L3 may be directly connected to the conductive segment L42, that is, the first conductive sub-segment L3 and the conductive segment L42 are connected to the tap a2 by sharing a part of the conductive segment.

In some possible implementations, the first conductive sub-segment L3 and the conductive segment L42 may be separately connected to a same tap a1 independently.

Certainly, in some other possible implementations, the first conductive sub-segment L3 and the conductive segment L42 may be connected to different taps.

The following describes a case in which the first conductive sub-segment L3 and the first conductive sub-segment L2 are connected to the same tap port T1.

In some possible implementations, as shown in FIG. 11a, the first conductive sub-segment L3 may be directly connected to the first conductive sub-segment L2, that is, the first conductive sub-segment L3 and the first conductive sub-segment L2 are connected to the tap port T1 by sharing a part of the conductive segment.

In some possible implementations, the first conductive sub-segment L3 and the first conductive sub-segment L2 may be separately connected to the same tap port T1 independently.

Certainly, in some other possible implementations, the first conductive sub-segment L3 and the first conductive sub-segment L2 may be connected to different tap ports. In this case, two tap ports are disposed in the inductor circuit 10-1.

In the inductor circuit 10-1 provided in this embodiment, inductances between any two ports of a first primary port P1, a second primary port P2, and the tap port T1 in the inductor circuit 10-1 can be switched by controlling on/off of a switch s1 and the switch s3. Similarly, the inductor circuit 10-2 has the same structure.

Embodiment 9

Figure 12A:
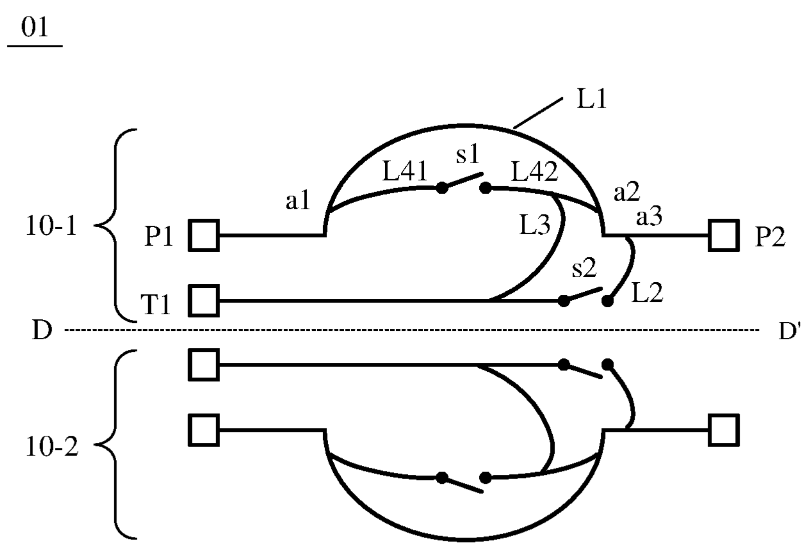
FIG. 12*a* is a schematic diagram of a layout of an inductor according to an embodiment of this application.
Figure 12B:
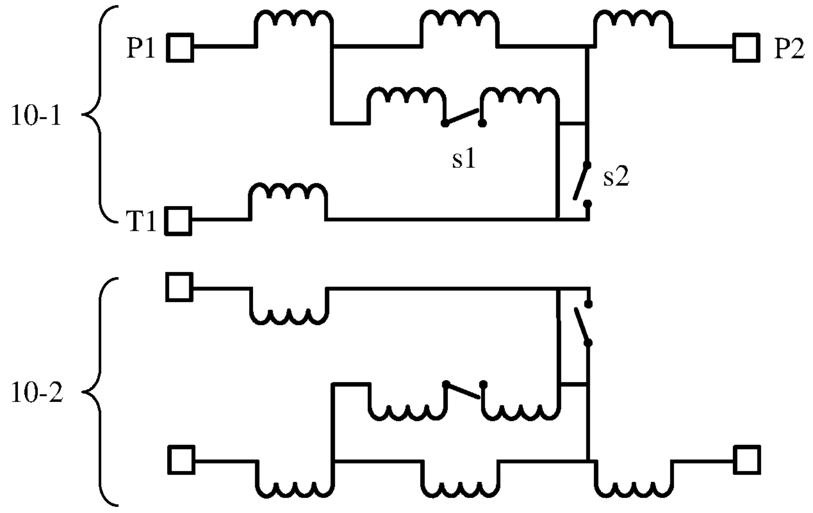
FIG. 12*b* is a schematic diagram of an equivalent circuit of the inductor in FIG. 12*a;*

FIG. 12a is a schematic diagram of a layout of an inductor o1 according to an embodiment. FIG. 12b is an equivalent circuit diagram of FIG. 12a. Refer to FIG. 12a and FIG. 12b. A difference between an inductor circuit 10-1 in the inductor o1 provided in this embodiment and the inductor circuit 10-1 in Embodiment 8 is that a switch s2 is disposed on a first conductive sub-segment L2, and no switch is disposed on a first conductive sub-segment L3.

In the inductor circuit 10-1 provided in this embodiment, inductances between any two ports in a first primary port P1, a second primary port P2, and a tap port T1 of the inductor circuit 10-1 can be switched by controlling on/off of the switch s1 and the switch s2. Similarly, the inductor circuit 10-2 has the same structure.

Embodiment 10

Figure 13A:
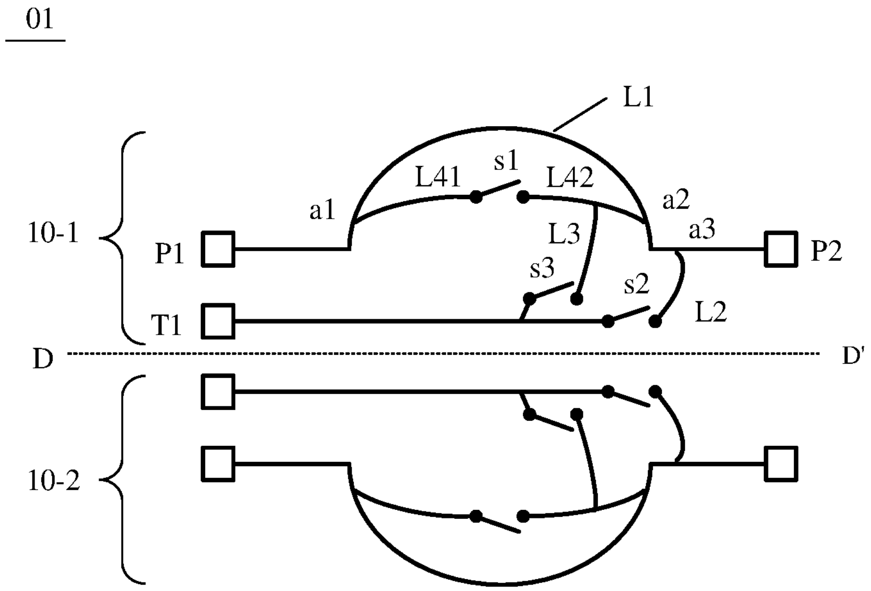
FIG. 13*a* is a schematic diagram of a layout of an inductor according to an embodiment of this application.
Figure 13B:
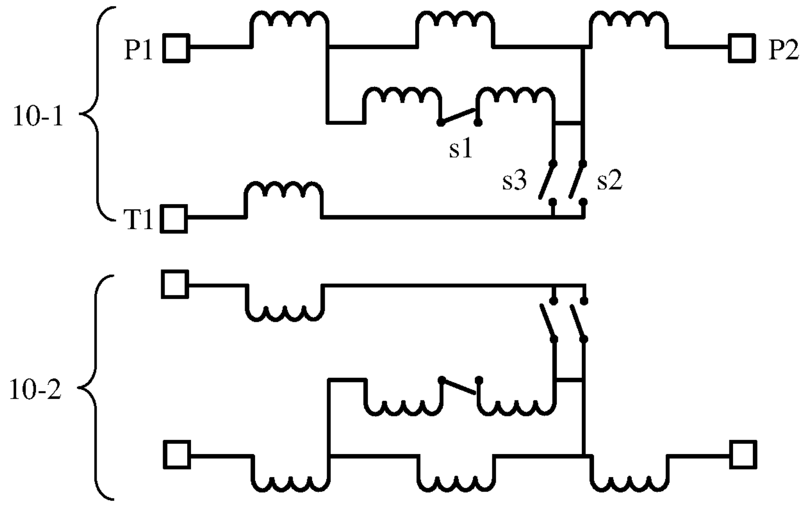
FIG. 13*b* is a schematic diagram of an equivalent circuit of the inductor in FIG. 13*a;*

FIG. 13a is a schematic diagram of a layout of an inductor o1 according to an embodiment. FIG. 13b is an equivalent circuit diagram of FIG. 13a. Refer to FIG. 13a and FIG. 13b. A difference between an inductor circuit 10-1 in the inductor o1 provided in this embodiment and the inductor circuit 10-1 in Embodiment 9 is that a switch s2 is disposed on a first conductive sub-segment L2, and a switch s3 is further disposed on a first conductive sub-segment L3.

In the inductor circuit 10-1 provided in this embodiment, inductances between any two ports in a first primary port P1, a second primary port P2, and a tap port T1 of the inductor circuit 10-1 can be switched by controlling on/off of a switch s1, the switch s2, and the switch s3. Similarly, the inductor circuit 10-2 has the same structure.

Embodiment 11

Figure 14A:
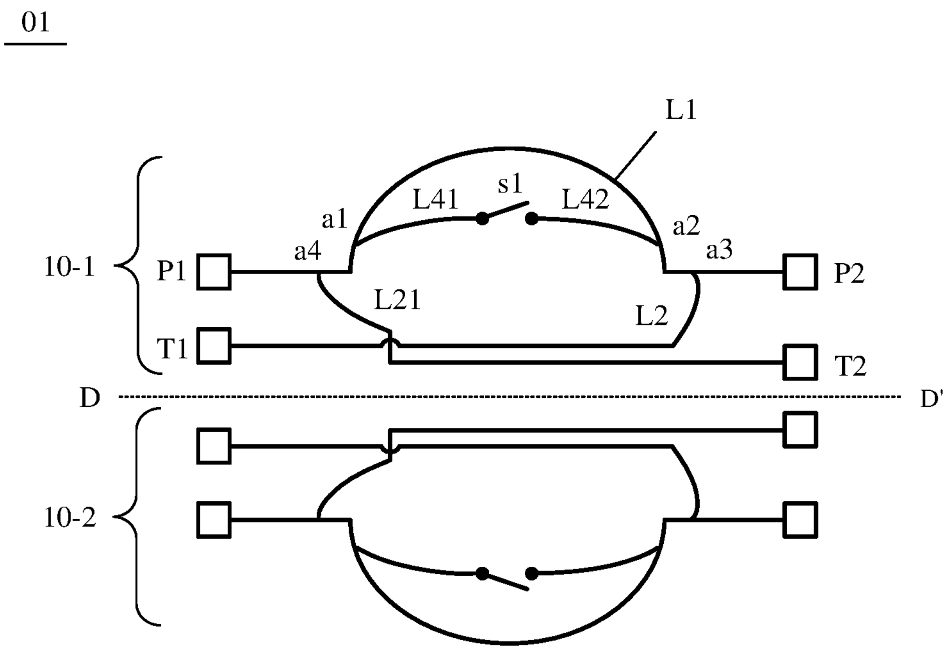
FIG. 14*a* is a schematic diagram of a layout of an inductor according to an embodiment of this application.
Figure 14B:
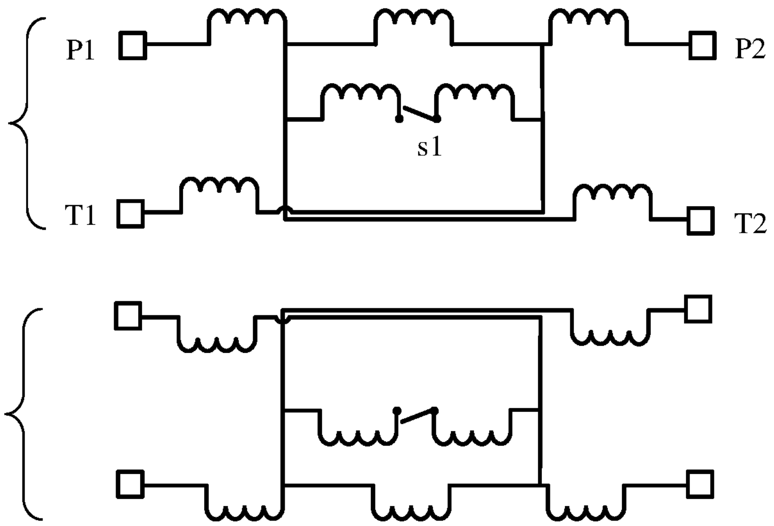
FIG. 14*b* is a schematic diagram of an equivalent circuit of the inductor in FIG. 14*a;*

FIG. 14a is a schematic diagram of a layout of an inductor o1 according to an embodiment. FIG. 14b is an equivalent circuit diagram of FIG. 14a. Refer to FIG. 14a and FIG. 14b. Different from the inductor circuit 10-1 in Embodiment 7, in addition to a first conductive sub-segment L2, an inductor circuit 10-1 in the inductor o1 provided in this embodiment further includes a first conductive sub-segment L21. In other words, the two first conductive sub-segments L2 and L21 are disposed in the inductor circuit 10-1. One end of the first conductive sub-segment L21 is connected to a tap a4 on a side close to a first primary port P1, and the other end of the first conductive sub-segment L21 is connected to a tap port T2 on a side close to a second primary port P2. For example, the first conductive sub-segment L2 and the first conductive sub-segment L21 may be disposed approximately symmetrically in a direction of a vertical axis of symmetry DD'.

In the inductor circuit 10-1 provided in this embodiment, inductances between any two ports in the first primary port P1, the second primary port P2, and two tap ports T1 and T2 of the inductor circuit 10-1 can be switched by controlling on/off of the switch s1. Similarly, the inductor circuit 10-2 has the same structure.

Embodiment 12

Figure 15A:
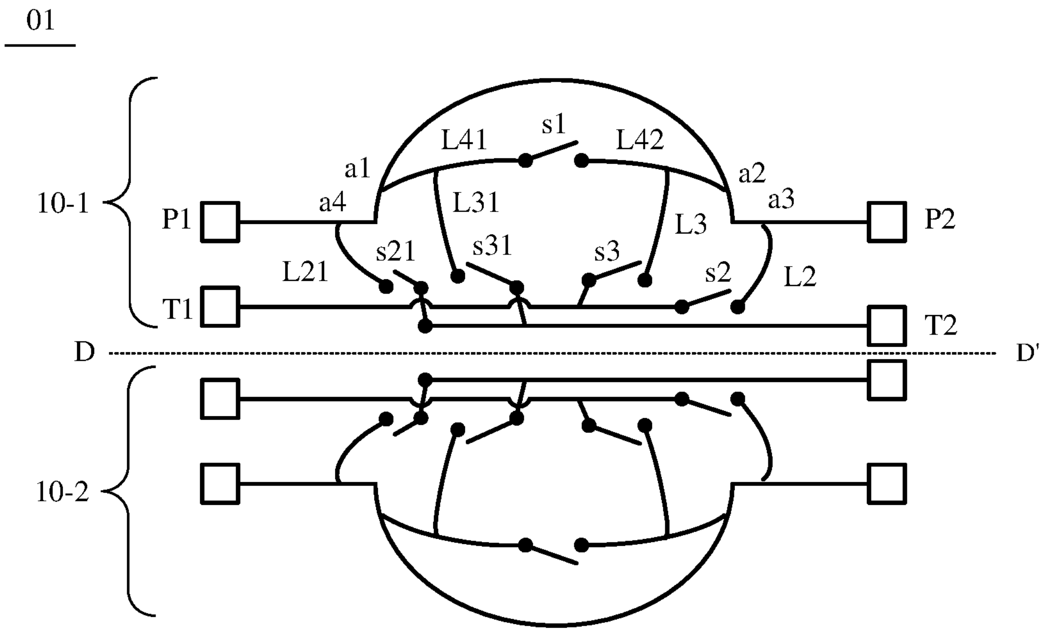
FIG. 15*a* is a schematic diagram of a layout of an inductor according to an embodiment of this application.
Figure 15B:
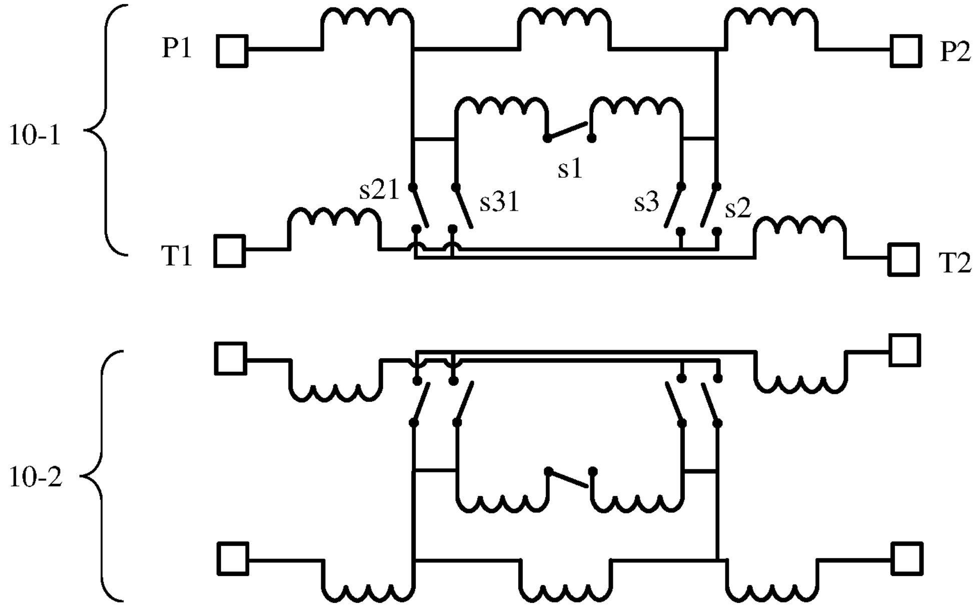
FIG. 15*b* is a schematic diagram of an equivalent circuit of the inductor in FIG. 15*a;*

FIG. 15a is a schematic diagram of a layout of an inductor o1 according to an embodiment. FIG. 15b is an equivalent circuit diagram of FIG. 15*a*. Refer to FIG. 15*a* and FIG. 15*b*. Based on the inductor circuit 10-1 in Embodiment 11, a first conductive sub-segment L3 and a first conductive sub-segment L31 are further disposed on an inductor circuit 10-1 in the inductor o1 provided in this embodiment. In other words, in this case, the inductor circuit 10-1 includes four first conductive sub-segments L2, L3, L21, and L31.

For example, as shown in FIG. 15, the four first conductive sub-segments L2, L3, L21, and L31 are connected to different taps. The first conductive sub-segment L2 and the first conductive sub-segment L3 are connected to a same tap port T1 by sharing a part of the conductive segment, and the first conductive sub-segment L21 and the first conductive sub-segment L31 are connected to a same tap port T2 by sharing a part of the conductive segment. The first conductive sub-segment L3 and a conductive segment L42 are connected to a tap a2 by sharing a part of the conductive segment, and the first conductive sub-segment L31 and a conductive segment L41 are connected to a tap a1 by sharing a part of the conductive segment. For settings of the first conductive sub-segments L2 and L3 and the related switches, refer to settings of the first conductive sub-segments L2 and L3 and the related switches in the foregoing Embodiment 8, Embodiment 9, and Embodiment 10. Details are not described herein again.

For the settings of the first conductive sub-segments L21 and L31 and the related switches, the first conductive sub-segment L21 and the first conductive sub-segment L2 are approximately symmetrically disposed, and the first conductive sub-segment L31 and the first conductive sub-segment L3 are approximately symmetrically disposed. Correspondingly, refer to the settings of the first conductive sub-segments L2 and L3 and the related switches in the foregoing Embodiment 8, Embodiment 9, and Embodiment 10, and details are not described herein again.

In the inductor circuit 10-1 provided in this embodiment, inductances between any two ports in a first primary port P1, a second primary port P2, and two tap ports T1 and T2 of the inductor circuit 10-1 can be switched by controlling on/off of a switch s1, a switch s2, a switch s3, a switch s21, and a switch s3*i*. Similarly, the inductor circuit 10-2 has the same structure.

On this basis, to enable that when the inductor o1 is applied to an oscillator, there is small impact between the inductor o1 and another circuit element, for the foregoing embodiments (including Embodiment 7, Embodiment 8, Embodiment 9, Embodiment 10, Embodiment 11, and Embodiment 12) of an inductor o1 using two inductor circuits 10-1 and 10-2, a shape formed by primary conductive segments in the two inductor circuits 10-1 and 10-2 may be set to "8"-shaped. In this way, magnetic fields in opposite directions are generated at two ends of the "8"-shaped inductor o1, and the magnetic fields can counteract each other. Therefore, great impact on another circuit element is avoided, and great impact on the inductor o1 caused by the another circuit element is avoided.

Figure 16:
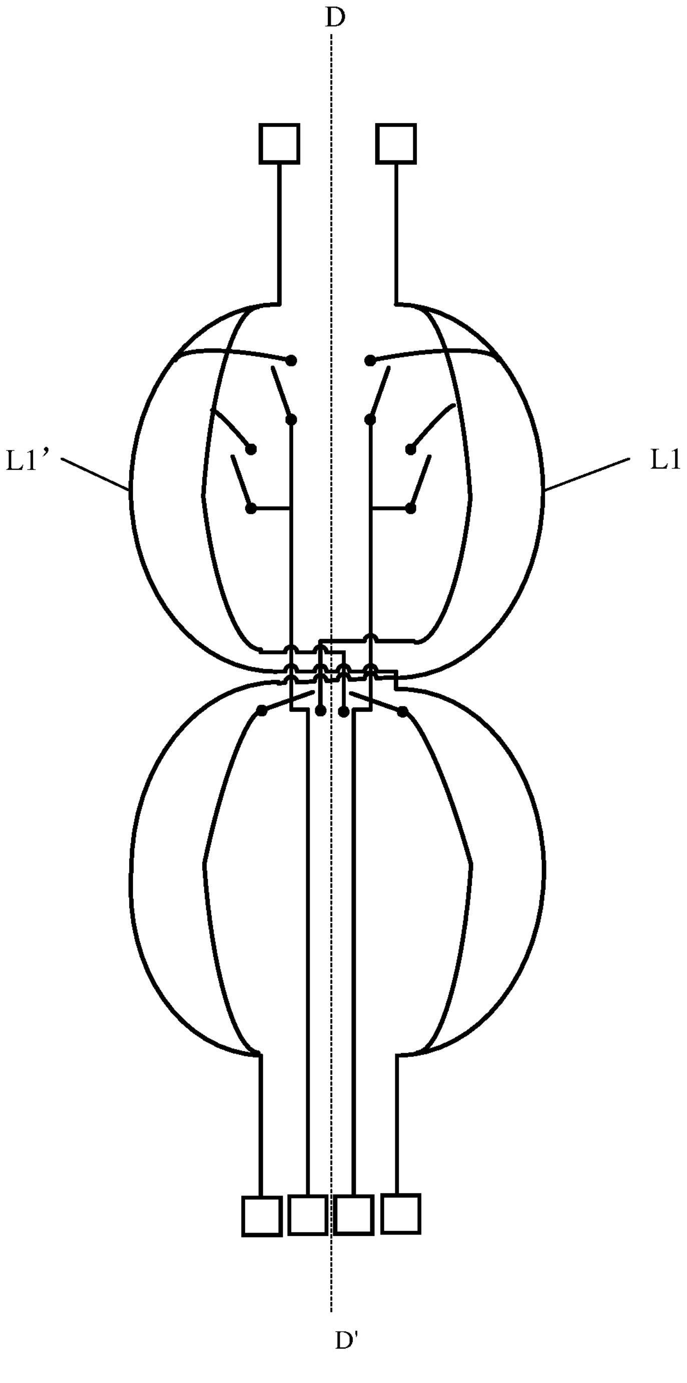
FIG. 16 is a schematic diagram of a layout of an inductor according to an embodiment of this application.

For example, the inductor o1 in Embodiment 10 is used as an example. As shown in FIG. 16, primary conductive segments L1 and L1' in the two inductor circuits 10-1 and 10-2 are "8"-shaped. The primary conductive segment L1 of the inductor circuit 10-1 forms a left half part of a lower ring and a right half part of an upper ring in a shape of "8", and the primary conductive segment L1' of the inductor circuit 10-2 forms a right part of the lower ring and a left part of the upper ring in the shape of "8".

Figure 17:
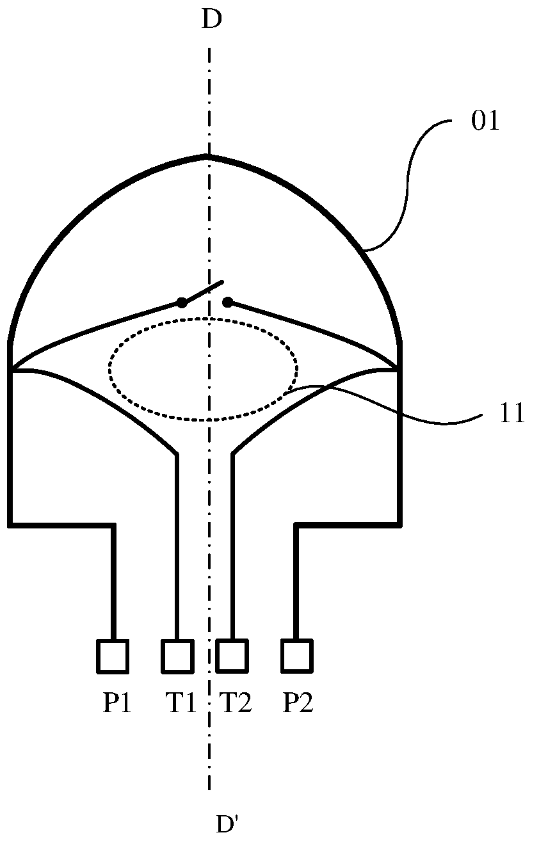
FIG. 17 is a schematic diagram of a structure of an inductor according to an embodiment of this application.
Figure 18:
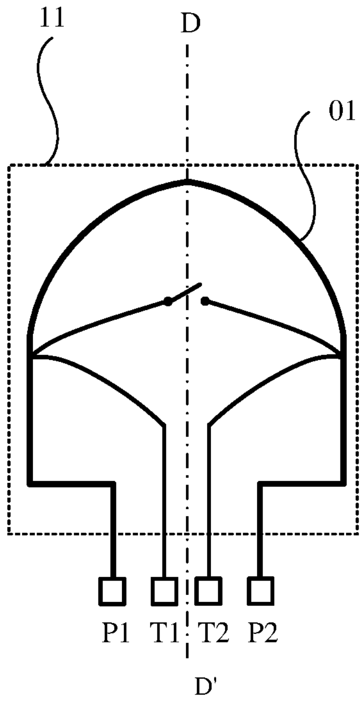
FIG. 18 is a schematic diagram of a structure of an inductor according to an embodiment of this application.

To quickly correct an inductance of the inductor o1, avoid tape-out again, and reduce costs, as shown in FIG. 17 or FIG. 18, in some embodiments, an inductance adjustment member 11 may be disposed on the packaging layer of the inductor o1, to further adjust the inductance of the inductor o1 by using the inductance adjustment member 11.

In some embodiments, to ensure that the inductor o1 has a good anti-interference capability when being applied to a differential circuit, as shown in FIG. 14 or FIG. 15, in some embodiments, the inductance adjustment member 11 may be disposed to be symmetric about the axis of symmetry DD' in the inductor o1.

In some embodiments, as shown in FIG. 17, the inductance adjustment member 11 may be a closed coil.

A shape of the closed coil is not limited in this application. The shape of the closed coil may be a circle, an ellipse, a quadrilateral, a hexagon, an octagon, or the like. In practice, the closed coil may be selectively set according to a requirement.

A size of the closed coil is not limited in this application. As shown in FIG. 17, in some possible implementations, the closed coil may be smaller than the non-closed loop formed by the primary conductive segment L1, and is located inside the non-closed loop. In some possible implementations, the closed coil may alternatively be larger than the non-closed loop formed by the primary conductive segment L1, and the non-closed loop is located inside the closed coil.

In some embodiments, the closed coil may be connected to a ground end, to reduce interference of the closed coil to the inductor o1.

Figure 19:
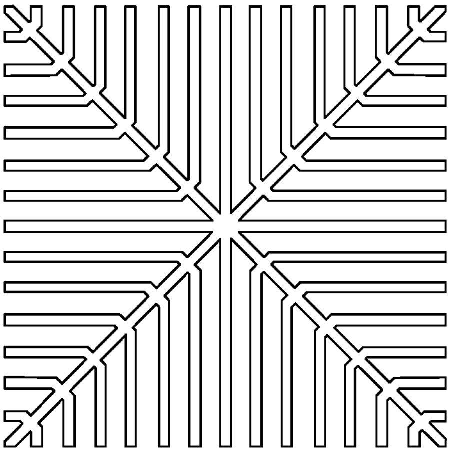
FIG. 19 is a schematic diagram of a structure of a metal shielding pattern according to an embodiment of this application.

In some embodiments, as shown in FIG. 18, the inductance adjustment member 11 may be a metal shielding pattern. The metal shielding pattern may be a planar metal pattern or a metal grid pattern, which is not specifically limited in this application. For example, as shown in FIG. 19, the metal shielding pattern may be a specified special metal pattern.

In some embodiments, the foregoing metal shielding pattern may be connected to the ground end, to reduce interference of the metal shielding pattern to the inductor o1.

It may be understood that application of the inductor o1 in the oscillator is merely used as an example for description in this application. However, this application is not limited thereto. The inductor o1 in this application may also be applied to another integrated circuit other than the oscillator.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An inductor, comprising:

a primary conductive segment, wherein the primary conductive segment forms a non-closed loop, two ends of the primary conductive segment are respectively connected to two primary ports, and at least two taps are disposed on the primary conductive segment;

at least two first conductive sub-segments, wherein a first end of a first conductive sub-segment of the at least two first conductive sub-segments is connected to a first tap of the at least two taps, and a second end of the first conductive sub-segment is connected to a first tap port; and a switch, wherein the at least two first conductive sub-segments and the switch are each located inside the non-closed loop, wherein a first end of the switch is connected to the first tap of the at least two taps and the first conductive sub-segment, and wherein a second end of the switch is connected to a second tap of the at least two taps and a second conductive sub-segment of the at least two first conductive sub-segments.

2. The inductor according to claim 1, wherein the second conductive sub-segment of the at least two first conductive sub-segments is connected to a second tap port that is a different tap port than the first tap port.

3. The inductor according to claim 2, wherein:

the non-closed loop is axisymmetric; and the first conductive sub-segment and the second conductive sub-segment are symmetrical with each other about an axis of symmetry of the non-closed loop.

4. The inductor according to claim 1, wherein the at least two first conductive sub-segments further comprise a third conductive sub-segment and a fourth conductive sub-segment, wherein the first conductive sub-segment and the third conductive sub-segment are connected to the first tap port, and wherein the second conductive sub-segment and the fourth conductive sub-segment are connected to a second tap port that is a different tap port than the first tap port.

5. The inductor according to claim 4, wherein the non-closed loop is axisymmetric, and wherein a first group of the at least two first conductive sub-segments and a second group of the at least two first conductive sub-segments are symmetrical with each other about an axis of symmetry of the non-closed loop, wherein the first group of the at least two first conductive sub-segments comprises the first conductive sub-segment and the third conductive sub-segment, and wherein the second group of the at least two first conductive sub-segments comprise the second conductive sub-segment and the fourth conductive sub-segment.

6. The inductor according to claim 1, wherein:

the switch is directly connected to the first tap and the second tap of the at least two taps; or the switch is disposed on a fifth conductive sub-segment connected between the first tap and the second tap of the at least two taps.

7. The inductor according to claim 1, further comprising:

a package layer; and an inductor tuning device that is located on the package layer and that is connected to a ground end, wherein the inductor tuning device is a closed coil or a metal shielding pattern.

8. The inductor of claim 1, wherein the non-closed loop is axisymmetric.

9. An inductor, comprising: a primary conductive segment, at least two first conductive sub-segments, and a switch, wherein the primary conductive segment forms a non-closed loop, two ends of the primary conductive segment are respectively connected to two primary ports, at least two taps are disposed on the primary conductive segment, a first end of a first conductive sub-segment of the at least two first conductive sub-segments is connected to a first tap of the at least two taps, and a second end of the first conductive sub-segment is connected to a first tap port, and the at least two first conductive sub-segments and the switch each are located inside the non-closed loop;

wherein a first end of the switch is connected to the first tap of the at least two taps and the first conductive sub-segment, and wherein a second end of the switch is connected to a second tap of the at least two taps and a second conductive sub-segment of the at least two first conductive sub-segments; and wherein the two primary ports and the first tap port of the inductor are separately connected to a control circuit.

10. The inductor according to claim 9, wherein the second conductive sub-segment of the at least two first conductive sub-segments is connected to a second tap port that is a different tap port than the first tap port.

11. The inductor according to claim 9, wherein:

the non-closed loop is axisymmetric; and the first conductive sub-segment and the second conductive sub-segment are symmetrical with each other about an axis of symmetry of the non-closed loop.

12. The inductor according to claim 11, wherein the at least two first conductive sub-segments further comprise a third conductive sub-segment and a fourth conductive sub-segment, wherein the first conductive sub-segment and the third conductive sub-segment are connected to the first tap port, and wherein the second conductive sub-segment and the fourth conductive sub-segment are connected to a second tap port that is a different tap port than the first tap port.

13. The inductor according to claim 12, wherein the non-closed loop is axisymmetric, and wherein a first group of the at least two first conductive sub-segments and a second group of the at least two first conductive sub-segments are symmetrical with each other about an axis of symmetry of the non-closed loop, wherein the first group of the at least two first conductive sub-segments comprises the first conductive sub-segment and the third conductive sub-segment, and wherein the second group of the at least two first conductive sub-segments comprises the second conductive sub-segment and the fourth conductive sub-segment.

14. An inductor, comprising:

a primary conductive segment, wherein the primary conductive segment forms a non-closed loop, two ends of the primary conductive segment are respectively connected to two primary ports, and at least two taps are disposed on the primary conductive segment;

at least two first conductive sub-segments, wherein a first end of a first conductive sub-segment of the at least two first conductive sub-segments is connected to a first tap of the at least two taps, and a second end of the first conductive sub-segment is connected to a first tap port;

a first switch, wherein a first end of the first switch is connected to the first tap of the at least two taps and the first conductive sub-segment, and wherein a second end of the first switch is connected to a second tap of the at least two taps and a second conductive sub-segment of the at least two first conductive sub-segments; and a second switch on the first conductive sub-segment, wherein the at least two first conductive sub-segments, the first switch, and the second switch are each located inside the non-closed loop.

15. The inductor according to claim 14, further comprising a third switch on the second conductive sub-segment, wherein the third switch is located inside the non-closed loop.

16. The inductor according to claim 14, wherein the second conductive sub-segment of the at least two first conductive sub-segments is connected to a second tap port that is a different tap port than the first tap port.

17. The inductor according to claim 16, wherein:

the non-closed loop is axisymmetric; and the first conductive sub-segment and the second conductive sub-segment are symmetrical with each other about an axis of symmetry of the non-closed loop.

18. The inductor according to claim 14, wherein the at least two first conductive sub-segments further comprise a third conductive sub-segment and a fourth conductive sub-segment, wherein the first conductive sub-segment and the third conductive sub-segment are connected to the first tap port, and wherein the second conductive sub-segment and the fourth conductive sub-segment are connected to a second tap port that is a different tap port than the first tap port.

19. The inductor according to claim 18, wherein the non-closed loop is axisymmetric, and wherein a first group of the at least two first conductive sub-segments and a second group of the at least two first conductive sub-segments are symmetrical with each other about an axis of symmetry of the non-closed loop, wherein the first group of the at least two conductive sub-segments comprise the first conductive sub-segment and the third conductive sub-segment, and wherein the second group of the at least two first conductive sub-segments comprises the second conductive sub-segment and the fourth conductive sub-segment.

* * * * *